(12) United States Patent
Hayles et al.

(10) Patent No.: US 7,478,349 B2
(45) Date of Patent: Jan. 13, 2009

(54) AUTOMATICALLY SYNCHRONIZING TIMED CIRCUITS ON I/O DEVICES

(75) Inventors: Timothy J. Hayles, Austin, TX (US); Christopher J. Squibb, Austin, TX (US)

(73) Assignee: National Instruments Corporation, Austin, TX (US)

( * ) Notice: Subject to any disclaimer, the term of this patent is extended or adjusted under 35 U.S.C. 154(b) by 821 days.

(21) Appl. No.: 10/978,345

(22) Filed: Nov. 1, 2004

(65) Prior Publication Data

US 2006/0036992 A1    Feb. 16, 2006

Related U.S. Application Data

(60) Provisional application No. 60/601,540, filed on Aug. 13, 2004.

(51) Int. Cl.
*G06F 17/50* (2006.01)
*G06F 9/45* (2006.01)

(52) U.S. Cl. .................. 716/6; 716/5; 716/18; 703/13; 703/14; 714/36

(58) Field of Classification Search .................. 716/1, 716/4–6, 18; 700/286–306; 703/13, 14; 714/36

See application file for complete search history.

(56) References Cited

U.S. PATENT DOCUMENTS

| | | | |
|---|---|---|---|
| 5,481,741 A | 1/1996 | McKaskle et al. | |
| 6,014,612 A * | 1/2000 | Larson et al. | 702/183 |
| 6,314,553 B1 | 11/2001 | Stevens et al. | |
| 6,879,926 B2 | 4/2005 | Schmit et al. | |
| 6,880,130 B2 | 4/2005 | Makowski et al. | |
| 6,983,228 B2 | 1/2006 | Kodosky et al. | |
| 7,134,109 B2 * | 11/2006 | Hayles | 716/6 |
| 7,292,900 B2 * | 11/2007 | Kreidler et al. | 700/83 |
| 7,308,550 B2 * | 12/2007 | Cornett | 711/170 |
| 2003/0004670 A1 * | 1/2003 | Schmit et al. | 702/123 |
| 2004/0158804 A1 | 8/2004 | Hayles | |
| 2005/0034106 A1 | 2/2005 | Kornerup et al. | |

* cited by examiner

*Primary Examiner*—Thuan Do
*Assistant Examiner*—Nghia M Doan
(74) *Attorney, Agent, or Firm*—Meyertons Hood Kivlin Kowert & Goetzel, P.C.; Jeffrey C. Hood; Mark S. Williams

(57) ABSTRACT

System and method for automatically synchronizing multiple I/O devices with homogeneous and/or heterogeneous timing and I/O channel types. A graphical program specifying configuration and operation of a plurality of timed circuits, e.g., input circuits and/or output circuits, comprised on one or more I/O devices, may be created in response to user input, and executed to perform an I/O operation using the devices, where executing the program includes invoking software to: analyze the timed circuits to determine timing and triggering information for operation of the circuits, configure the circuits in accordance with the timing and triggering information, and operate the configured circuits to perform the operation. The analyzing may include determining the timed circuits, and one or more of: number, types, sharing, sources, exporting, and routing, of timing signals for each circuit, and starting/stopping orders for the circuits. User input may be received specifying setting and querying properties of the circuits.

27 Claims, 20 Drawing Sheets

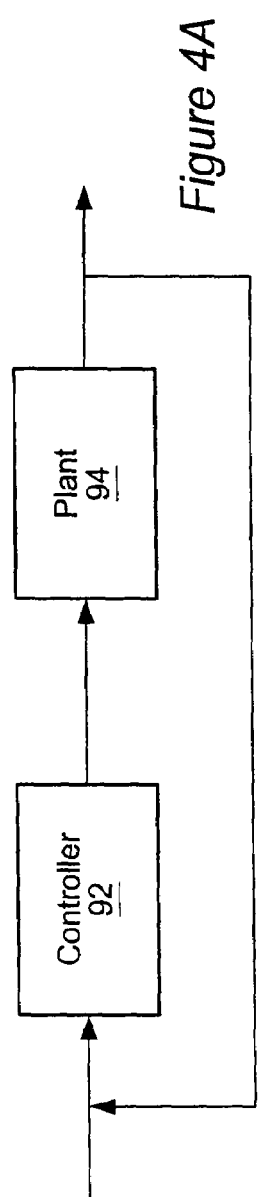
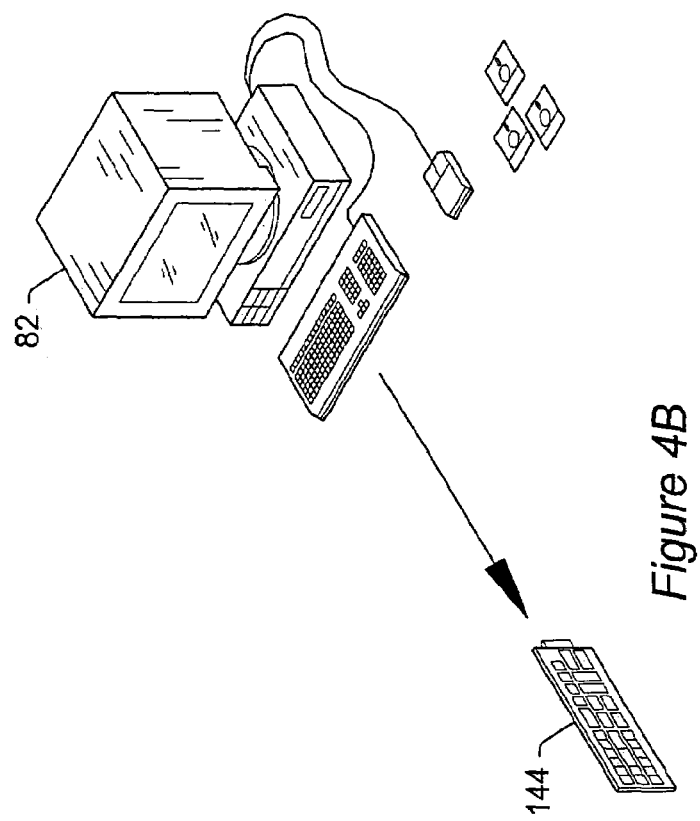

US 7,478,349 B2

AUTOMATICALLY SYNCHRONIZING TIMED CIRCUITS ON I/O DEVICES

PRIORITY DATA

The application claims benefit of priority of U.S. Provisional Application Ser. No. 60/601,540, titled "Automatic Synchronization of I/O Devices", filed Aug. 13, 2004, and whose inventors were Timothy J. Hayles and Christopher J. Squibb.

FIELD OF THE INVENTION

The present invention relates to the field of graphical programming, and more particularly to a system and method for enabling a graphical program to automatically synchronize devices with homogeneous and heterogeneous timing and I/O channel types.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

In many systems, such as measurement, control, automation, machine vision, testing, and simulation systems, among others, operations require configuration of timing and triggering properties that control when the operations start, how fast they acquire or generate data and when they stop. When two or more operations share one or more aspects of their timing and triggering configuration they are said to be synchronized. This synchronization is generally specified and implemented in a program, such as a graphical program, as exemplified by LabVIEW graphical programs, described above.

Prior art approaches generally require separate configuration of all shared timing and triggering properties between two or more operations. Also required is the knowledge of which signals to send between the operations and programming the devices to send and receive these signals, as well as the designation of one operation as the master and programming the application such that the master is the last one to be started. This approach does not scale well as the programming is duplicated for each operation added to the system.

FIG. 1A illustrates programming two devices using the LabVIEW graphical programming language so that both devices acquire data at identical points in time, according to the prior art. In this example, the device Dev1 is the master and the device Dev2 is the slave. Each device is programmed to obtain samples 100 points from a corresponding channel at a rate of 1000 points per second. Note that in this LabVIEW based example, the sample number and the sample rate may each be selected from a wide range of values. The specific values, 100 and 1000 respectively, given in this example, are not meant to be limiting. As shown, device Dev1 samples from its analog input channel ai0, while device Dev2 samples from its analog input channel ai0. Note also that each device may have a number of analog input channels, i.e., is not restricted to just one.

In this example, each device has a master timebase. The master timebase of a device is the primary clock signal used for controlling that device's operations. The master timebase signal of device Dev1 is shared with device Dev2. This sharing is indicated by the path $P_1$ running from the output of the MasterTimebase.Src of device Dev1 to the input of the MasterTimebase.Src of device Dev2. This sharing implies that device Dev2 will use Dev1's master timebase signal as its own. Each device derives its sample clock from the shared master timebase signal.

The start trigger of device Dev1 is shared with device Dev2. This sharing is indicated by the path $P_2$ extending from Dev1/aiStartTrigger to the left side of the StartDigitalEdge node in Dev2's portion of the program. This sharing implies that both devices will begin sampling at the same time, i.e., in response to a transition of the Dev1/aiStartTrigger signal.

The LabVIEW graphical programming language relies on data flow dependencies to determine the order in which operations occur in the program. As shown, in this example, an error cluster is being used to force a data dependency such that the slave device Dev2 is started before the master device Dev1. The error cluster is represented by the union of the thick wires $W_A$-$W_K$. Each such wire leaves the lower right corner of one node and enters at the lower left corner of a next node. LabVIEW data flow dependencies dictate that a node does not execute until all of its inputs are ready. In FIG. 1A, start node $S_1$ for the master device Dev1 cannot execute until after start node $S_2$ for the slave device Dev2 executes because the start node $S_1$ for the master device receives error cluster wire $W_H$ from the start node $S_2$ of the slave device Dev2.

When the start node $S_2$ executes, the configuration information represented by the programming of nodes $I_4$, $I_5$ and $I_6$ is transferred to the device Dev2, thus enabling device Dev2 to acquire data whenever its sampling condition is satisfied. As described above, the start node $S_1$ of device Dev1 executes after the start node $S_2$ has executed. When the start node $S_1$ executes, the configuration information represented by the programming of nodes $I_1$, $I_2$ and $I_3$ is transferred to the device Dev1, thus enabling device Dev1 to acquire data whenever its sampling condition is satisfied.

Note that the sampling start condition for device Dev2 is the rising edge of the StartTrigger signal of device Dev1 and that the StartTrigger signal of device Dev1 is not activated until after device Dev1 has been programmed by virtue of the execution of start node $S_1$. Thus, device Dev2 does not actually begin acquiring data until after the start node $S_1$ executes. In general, when a slave device receives an external control signal to condition its sampling of an input signal, the slave device may not actually begin acquiring data until the device supplying the control signal is activated.

Note that in this and other example graphical programs described below, the graphical program nodes are organized with respect to tasks, indicated by $T_1$ and $T_2$ of FIG. 1A, the two "wires" that begin respectively at create channel nodes $I_1$ and $I_4$ and extend horizontally to respective "clear" or "cleanup" nodes at the far right of the diagram, indicated by pencil erasers on their respective icons.

If a third device were to be added to this program, a third row of nodes corresponding to a third task, substantially identical to the slave device row in FIG. 1, would have to be added. Thus, program size and complexity, and commensurate programmer effort, increases substantially linearly with additional devices.

FIG. 1B shows another prior art approach (known to those skilled in the art of device programming and especially to users of LabVIEW) to accomplish substantially the same functionality as that programmed in FIG. 1A. The program of FIG. 1B is simpler as only one signal, the sample clock, is shared between the two devices. However, the two programs illustrated in FIGS. 1A and 1B do not produce the same degree of synchronization between the devices.

Note than in these examples, each device has a 20 MHz clock as its master timebase. The master timebase may be used to derive slower sample clocks. When a device 'A' is programmed to send its master timebase to a device 'B', the usage of the master timebase by device 'A' is delayed to compensate for the delay that occurs in propagating the signal from device 'A' to device 'B'. When device 'A' is programmed to send its sample clock to device 'B', no such delay occurs on device 'A'. The difference in time between when device 'A' acquires or generates a sample and when device 'B' does is greater when the sample clock is shared than if the master timebase were shared.

Additionally, there may be differences among data acquisition devices that may also have bearing on timing and synchronization of operations between the devices. Thus, there are numerous difficulties a customer may encounter in choosing the proper signals to share between tasks.

SUMMARY OF THE INVENTION

One embodiment of the present invention comprises a system and method for enabling a graphical program to automatically synchronize I/O devices with homogeneous and/or heterogeneous timing and I/O channel types.

First, a graphical program may be created or stored on a computer system, where the graphical program specifies configuration and operation of a plurality of timed circuits comprised on one or more I/O devices. The graphical program may be created or assembled by the user arranging on a display a plurality of nodes or icons and then interconnecting the nodes to create the graphical program. The graphical program may implement a function, such as a test, measurement, automation, control, machine vision, analysis, or simulation function, among others, that is desired to be performed.

The graphical program may then be executed to perform an I/O operation using the one or more I/O devices. In a preferred embodiment, executing the graphical program invokes software for operating the one or more I/O devices. In one embodiment, the software invoked by the graphical program may comprise driver software. For example, the driver software may include a plurality of driver programs or modules corresponding respectively to different devices or device types, or to different types of timed circuits.

The software may then analyze the plurality of timed circuits to determine timing and triggering information for operation of the plurality of timed circuits. The timing and triggering information may include any type of information related to the configuration and operation of the timed circuits for performing the I/O operation. In various embodiments, the analysis may involve any of various parameters and behaviors related to the timing and operation of the timed circuits.

For example, analyzing the plurality of timed circuits may include determining the plurality of timed circuits, where each of the plurality of timed circuits comprises an input circuit comprising one or more input channels, where the input circuit is operable to read data from the one or more input channels and provide the data to the graphical program, and/or an output circuit comprising one or more output channels, where the output circuit is operable to receive data from the graphical program and write the data to the one or more output channels. In some embodiments, the I/O operation includes a plurality of operations, e.g., utilizing multiple timed circuits, and so may be described as a composite timed operation.

Thus, in various embodiments, the plurality of timed circuits may be comprised on a plurality of I/O devices, or comprised on a single I/O device. The plurality of timed circuits may comprise identical sets of timing signals, or they may comprise different sets of timing signals. The plurality of timed circuits may include a plurality of channels, which may be all of the same I/O type, or which may comprise multiple I/O types, as described above. In other words, the timing and triggering for the plurality of timed circuits may be homogeneous or heterogeneous, as desired, and the system may utilize one, or a plurality, of I/O devices.

In some embodiments, analyzing the plurality of timed circuits may include determining number and types of timing signals for each of the plurality of timed circuits, and determining sharing of the multiplicity of timing signals in order to synchronize the timed circuits. In other words, the software or method may determine the number of timing signals and how these timing signals may be shared to synchronize operations of the timed circuits In some embodiments, analyzing the plurality of timed circuits may include determining sources of timing signals for each of the plurality of timed circuits, and determining timing signal routes from each of the sources to the plurality of timed circuits. In other words, the software or method may analyze the determined plurality of timed circuits and determine from where each timed circuit will receive timing signals for its timed operations. Note that the source of timing signals for each timed circuit may be another timed circuit, a clock signal, an external circuit or device, or any other type of signal source.

Other timing and triggering information that may be determined may include a starting order of the plurality of timed circuits, and a stopping order of the plurality of timed circuits. This type of order determination may be necessary to satisfy dependencies among the timed circuit operations. For example, if one circuit is slaved to another circuit, such that an operation of the slave circuit is triggered by a signal from the master, the slave circuit may need to be started first so that if the master circuit sends the trigger signal upon startup, the slave circuit will already be up and running, e.g., "listening" for the trigger signal when it occurs.

The software may then configure the timed circuits in accordance with the timing and triggering information. In other words, the software may set one or more parameters governing operation of the timed circuits. For example, in one embodiment, the software may write values to various registers on one or more I/O devices to configure the timed circuits.

After configuring the timed circuits in accordance with the timing and triggering information, the software may operate the configured plurality of timed circuits to perform the I/O operation. For example, the software may initiate operation of each of the plurality of timed circuits in accordance with the determined starting order mentioned above. Similarly, once the specified task or functionality is performed the software may terminate operation of each of the plurality of timed circuits in accordance with the determined stopping order, also mentioned above.

BRIEF DESCRIPTION OF THE DRAWINGS

A better understanding of the present invention can be obtained when the following detailed description of the preferred embodiment is considered in conjunction with the following drawings, in which:

FIG. 4A is a high level block diagram of an exemplary system which may execute or utilize graphical programs;

FIG. 4B illustrates an exemplary system which may perform control and/or simulation functions utilizing graphical programs;

Figure 1A:
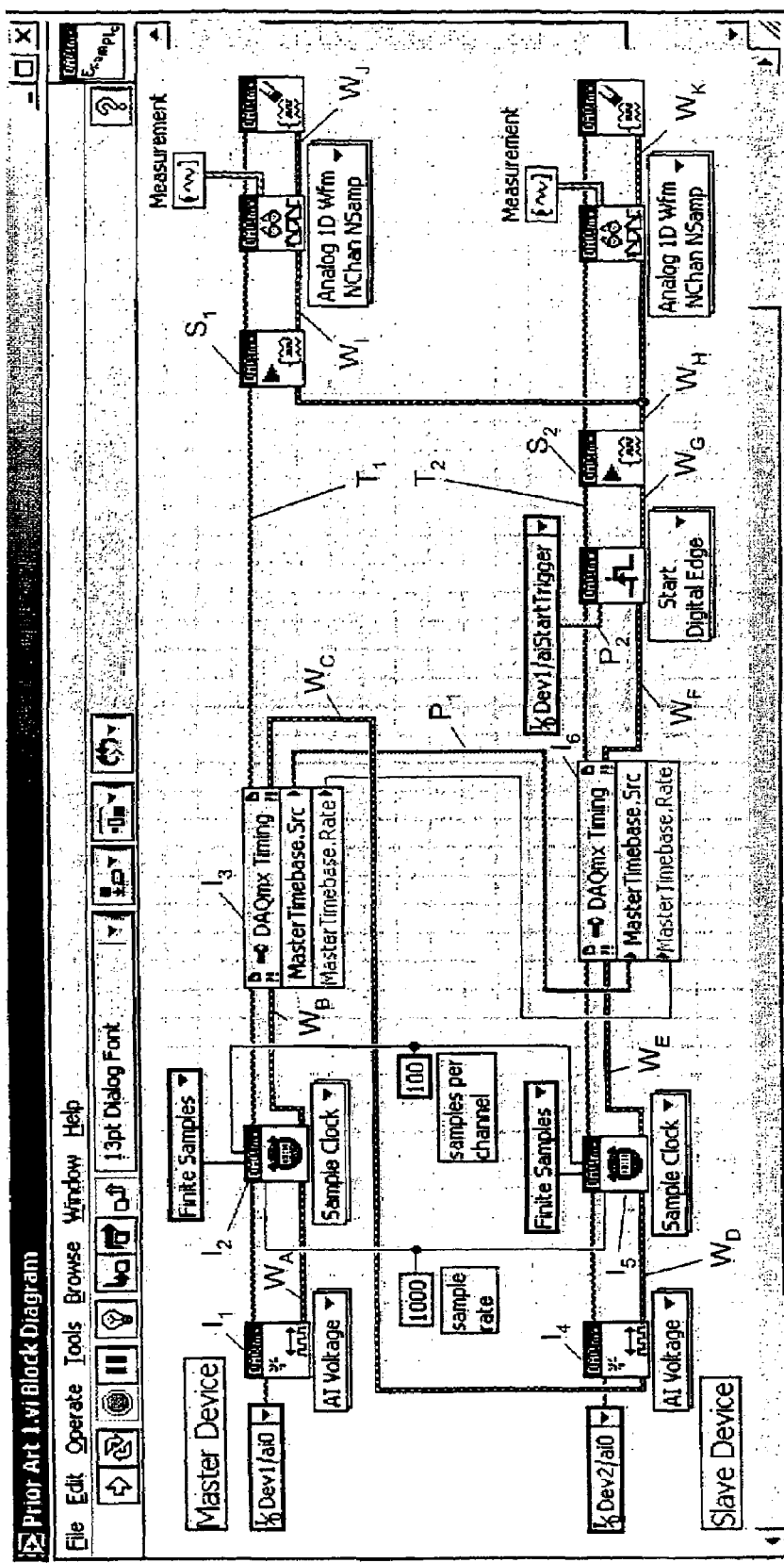
FIGS. 1A and 1B illustrate prior art approaches to synchronizing multiple devices.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Provisional Application Ser. No. 60/601,540, titled "Automatic Synchronization of I/O Devices", filed Aug. 13, 2004.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, Vis Sim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, Vis Sim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Operation—the acquisition or generation of data by a device, e.g., a computer, executing a program.

Timing signal—a digital edge (typically transistor-transistor logic (TTL)).

Timed operation—an operation where the stimulus for acquisition or generation of data is a timing signal (as opposed to a software command). The timing signal controls when some aspect of a timed operation occurs. Examples include: when the operation is started, and when a sample is taken. The timing signal can be shared between two or more such operations to synchronize them.

I/O channel—one of an analog input (AI), analog output (AO), digital input (DI), digital output (DO), counter input (CI) or counter output (CO) channel where data can be acquired or generated.

Timed circuit—an electrical circuit configurable to generate timing signals or to respond to externally generated timing signals in order to read data from one or more input channels or write data to one or more output channels. Timed circuits vary in type according to the number and types of timing signals they include and the type of I/O channel they control to acquire or generate data.

Homogenous timing and triggering—where a multiplicity of timed circuits comprising the timed operation are all of the same type (e.g., the timed circuits include the same number and type of timing signals).

Heterogeneous timing and triggering—where two or more of a multiplicity of timed circuits comprising a timed operation are of different types (e.g., the two or more timed circuits comprise a different number and/or different types of timing signals).

Homogenous I/O channels—where a multiplicity of I/O channels comprising a timed operation are all of the same type (e.g., all I/O channels are of analog input (AI) type).

Heterogeneous I/O channels—where two or more of a multiplicity of I/O channels comprising a timed operation are of different types (e.g., one I/O channel is of analog input (AI) type and another I/O channel is of analog output (AO) type).

Figure 2A:
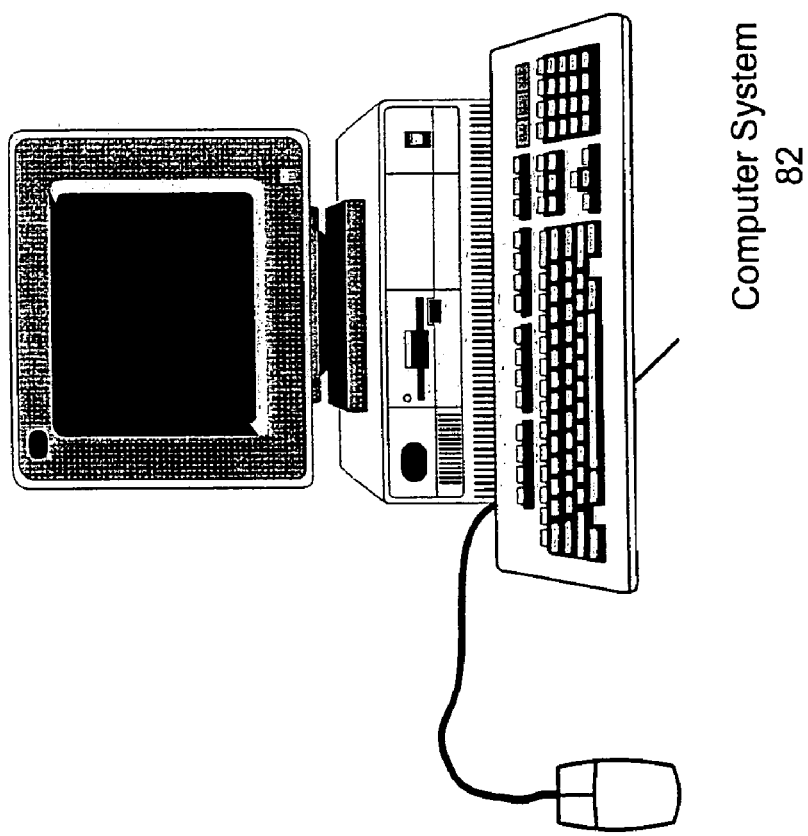
FIG. 2A illustrates a computer system operable to execute a graphical program according to an embodiment of the present invention.

FIG. 2A—Computer System

FIG. 2A illustrates a computer system 82 operable to execute a graphical program configured to automatically synchronize input/output (I/O) devices with homogeneous and/or heterogeneous timing and I/O channel types. One embodiment of a method for creating a graphical program operable to automatically synchronize I/O devices with homogeneous and/or heterogeneous timing and I/O channel types is described below.

As shown in FIG. 2A, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium (s) on which one or more computer programs or software components according to one embodiment of the present invention may be stored. For example, the memory medium may store one or more graphical programs and software, e.g., driver software, which are executable to perform the methods described herein. Also, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 2B:
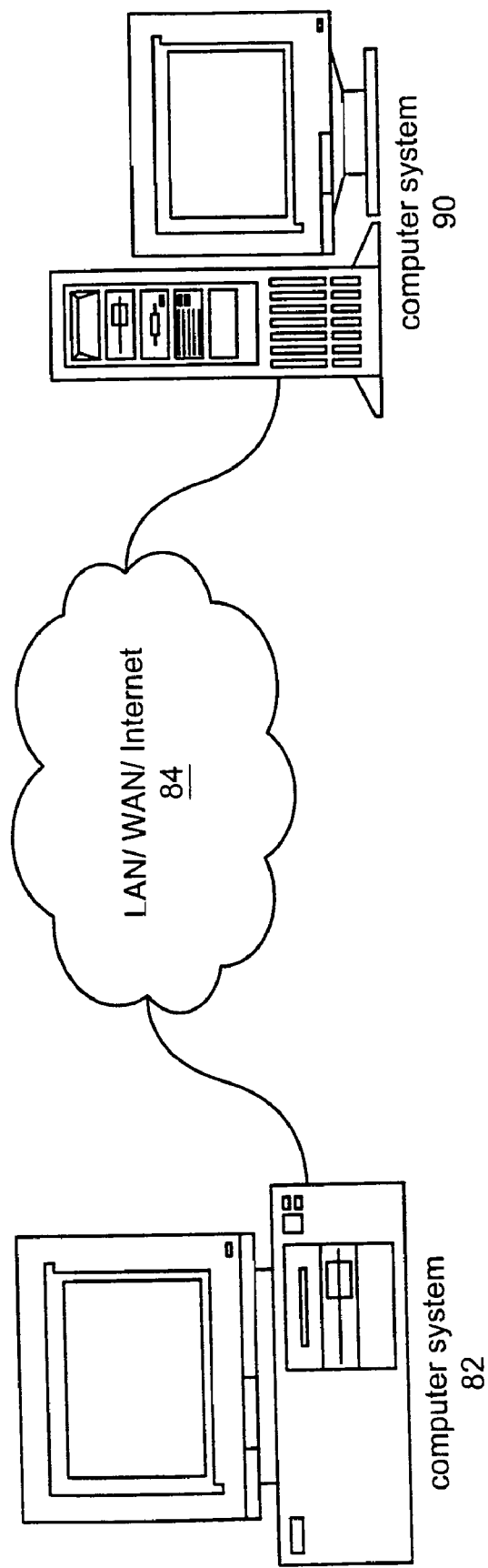
FIG. 2B illustrates a network system comprising two or more computer systems that may implement an embodiment of the present invention.

FIG. 2B—Computer Network

FIG. 2B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 3A:
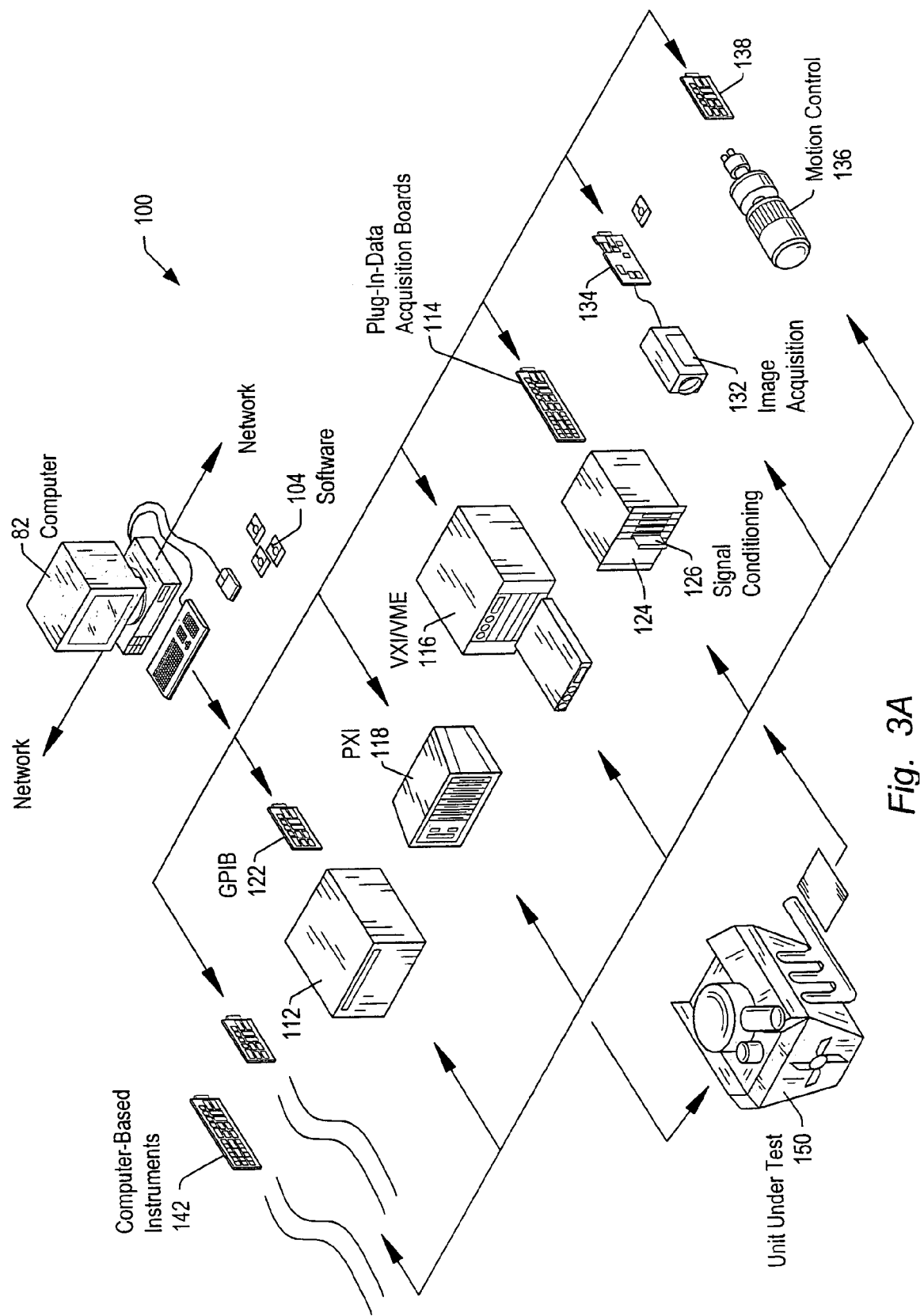
FIG. 3A illustrates an instrumentation control system according to one embodiment of the invention.

FIG. 3A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 3B:
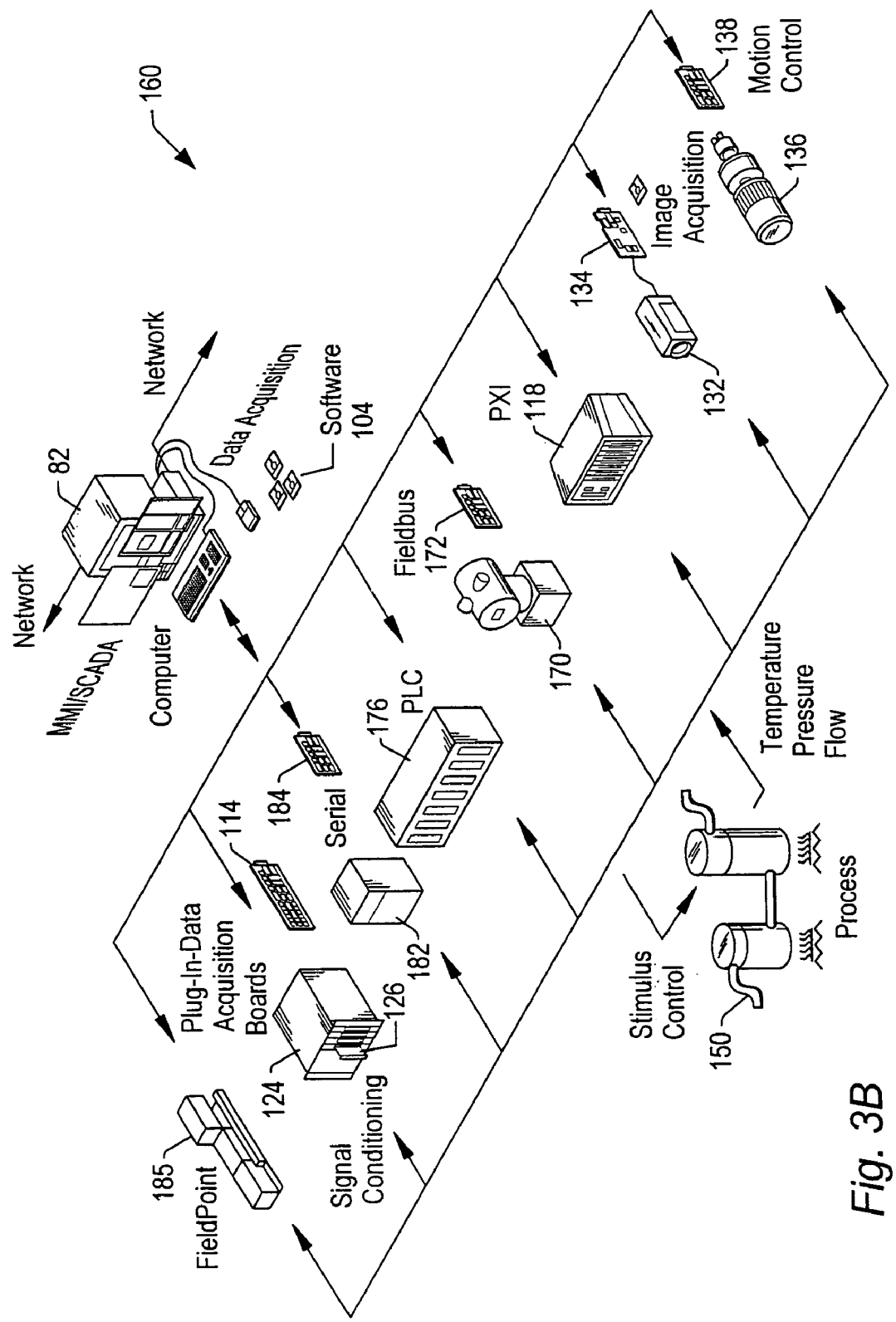
FIG. 3B illustrates an industrial automation system according to one embodiment of the invention.

FIG. 3B illustrates an exemplary industrial automation system 160 which may implement embodiments of the invention. The industrial automation system 160 is similar to the instrumentation or test and measurement system 100 shown in FIG. 3A. Elements which are similar or identical to elements in FIG. 3A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

FIG. 4A is a high level block diagram of an exemplary system which may execute or utilize graphical programs, according to various embodiments of the present invention. FIG. 4A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

FIG. 4B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 3A, 3B, and 4B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 3A and 3B, may be referred to as virtual instruments.

Figure 5:
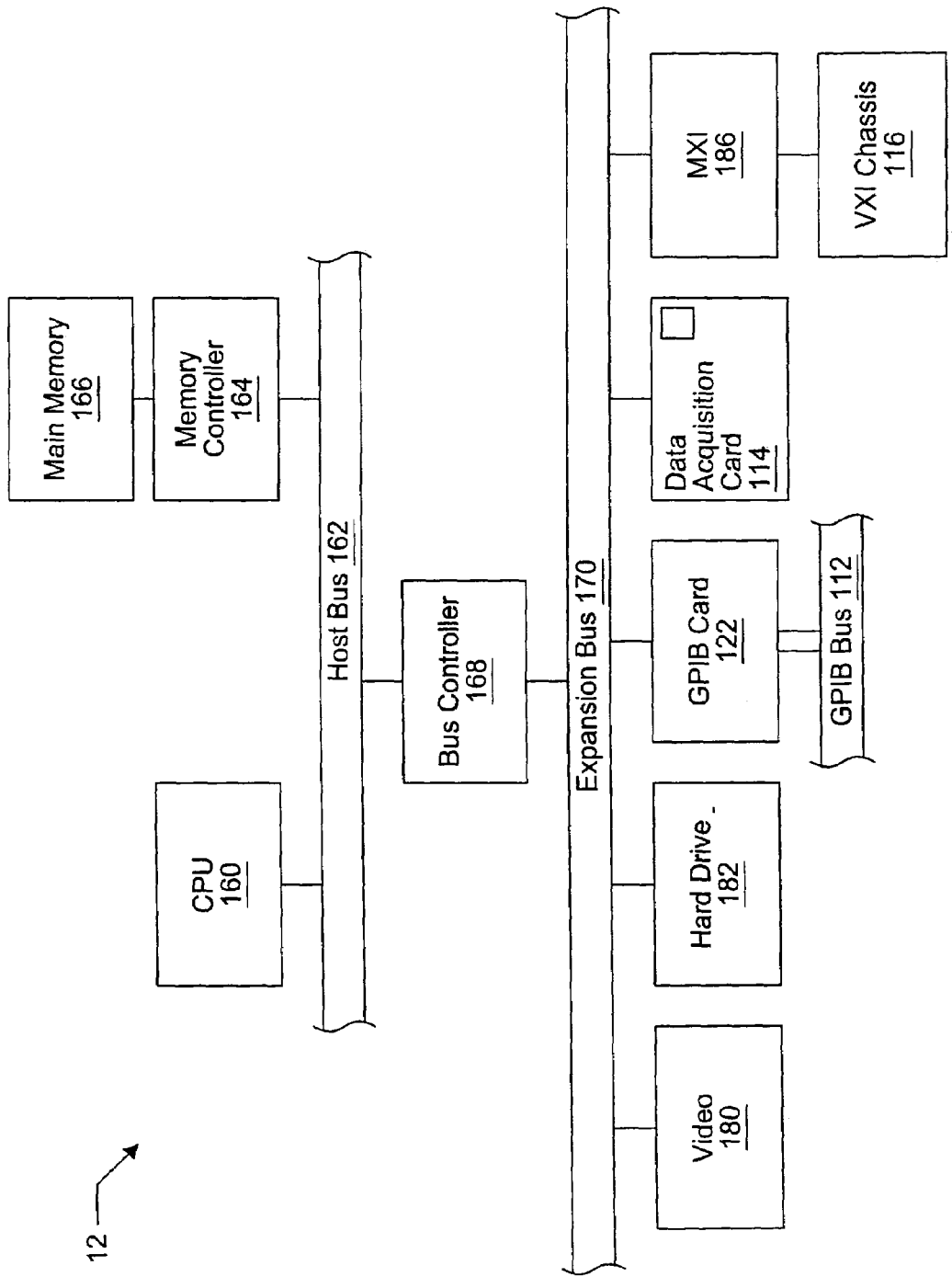
FIG. 5 is an exemplary block diagram of the computer systems of FIGS. 2A, 2B, 3A and 3B, and 4B.

FIG. 5—Computer System Block Diagram

FIG. 5 is a block diagram representing one embodiment of the computer system 82 and/or 90 illustrated in FIGS. 2A and 2B, or computer system 82 shown in FIGS. 3A or 3B. It is noted that any type of computer system configuration or architecture can be used as desired, and FIG. 5 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program operable to automatically synchronize I/O devices with homogeneous and/or heterogeneous timing and I/O channel types, as well as a graphical program development environment for creating and modifying such graphical programs. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 6:
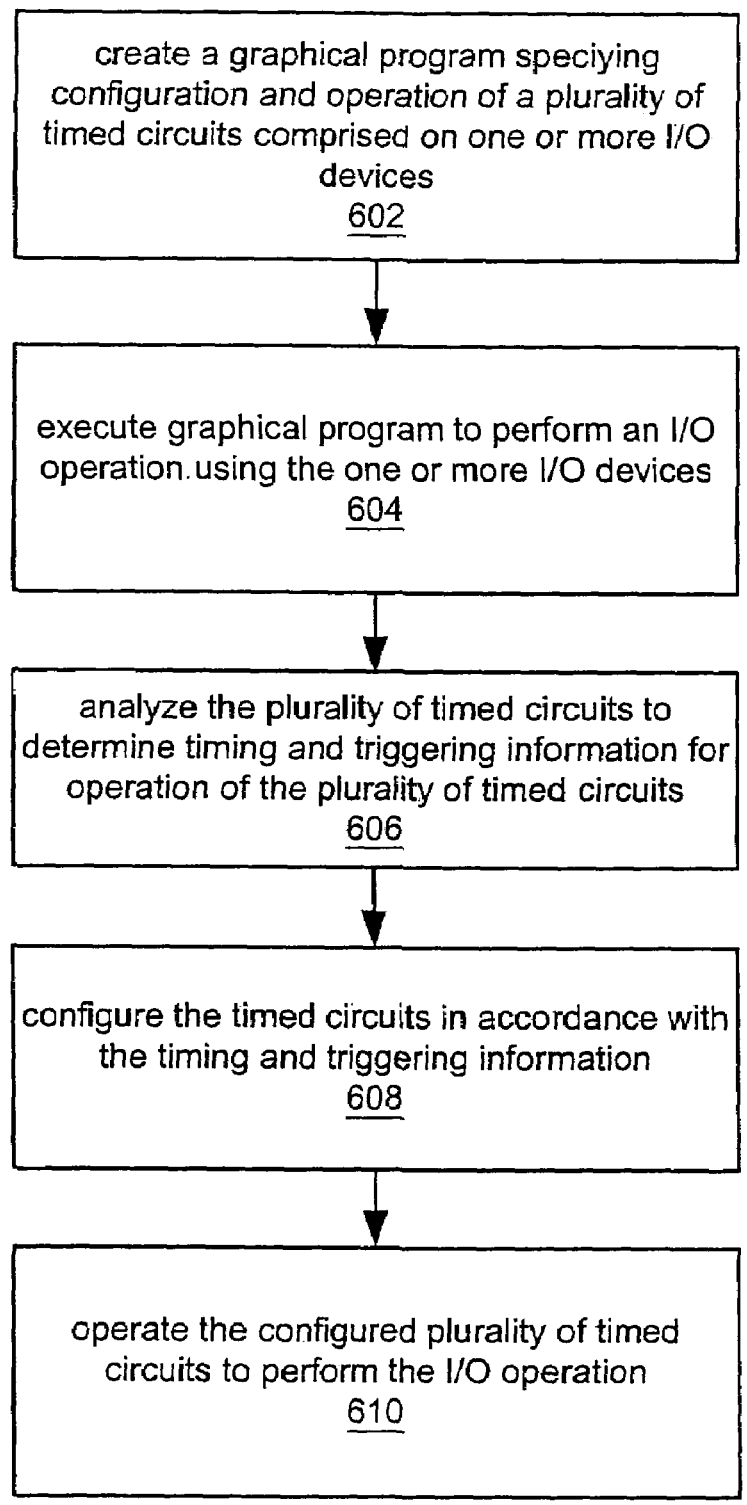
FIG. 6 is a flowchart diagram illustrating one embodiment of a method for automatically synchronizing I/O devices with homogeneous and/or heterogeneous timing and I/O channel types.

FIG. 6—Flowchart of a Method for Automatically Synchronizing I/O Devices

FIG. 6 illustrates a method for automatically synchronizing I/O devices with homogeneous and/or heterogeneous timing and I/O channel types, according to one embodiment. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 602, a graphical program may be created on the computer system 82 (or on a different computer system), where the graphical program specifies configuration and operation of a plurality of timed circuits comprised on one or more I/O devices. The graphical program may be created or assembled by the user arranging on a display a plurality of nodes or icons and then interconnecting the nodes to create the graphical program. In response to the user assembling the graphical program, code and/or data structures may be created and stored which represent the graphical program. The nodes may be interconnected in one or more of a graphical data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be programmatically created in 262, e.g., by the user creating or specifying information, such as a prototype, followed by automatic or programmatic creation of the graphical program from the information. An example of this functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a function, such as a test, measurement, automation, control, machine vision, analysis, or simulation function, among others, that is desired to be performed by the instrument(s).

A more detailed description of graphical program creation is provided below in the section titled "Creating the Graphical Program".

In 604, the graphical program may be executed to perform an I/O operation using the one or more I/O devices. In a preferred embodiment, executing the graphical program invokes software for operating the one or more I/O devices. In one embodiment, the software invoked by the graphical program may comprise driver software. For example, in some embodiments, the driver software may include a plurality of driver programs or modules corresponding respectively to different devices or device types, or to different types of timed circuits.

In 606, the software may analyze the plurality of timed circuits to determine timing and triggering information for operation of the plurality of timed circuits. The timing and triggering information may include any type of information related to the configuration and operation of the timed circuits for performing the I/O operation.

For example, in one embodiment, analyzing the plurality of timed circuits may include determining the plurality of timed circuits, where each of the plurality of timed circuits comprises an input circuit comprising one or more input channels, where the input circuit is operable to read data from the one or more input channels and provide the data to the graphical program, or an output circuit comprising one or more output channels, where the output circuit is operable to receive data from the graphical program and write the data to the one or more output channels. In some embodiments, the I/O operation includes a plurality of operations, e.g., utilizing multiple timed circuits, and so may be described as a composite timed operation.

Thus, in various embodiments, the plurality of timed circuits may be comprised on a plurality of I/O devices, or comprised on a single I/O device. The plurality of timed circuits may comprise identical sets of timing signals, or they may comprise different sets of timing signals. The plurality of timed circuits may include a plurality of channels, which may be all of the same I/O type, or which may comprise multiple I/O types, as described above. In other words, the timing and triggering for the plurality of timed circuits may be homogeneous or heterogeneous, as desired, and the system may utilize one, or a plurality, of I/O devices.

In some embodiments, analyzing the plurality of timed circuits may include determining number and types of timing signals for each of the plurality of timed circuits, and determining sharing of the multiplicity of timing signals in order to synchronize the timed circuits. In other words, the software or method may determine the number of timing signals and how these timing signals may be shared to synchronize operations of the timed circuits In some embodiments, analyzing the plurality of timed circuits may include determining sources of timing signals for each of the plurality of timed circuits, and determining timing signal routes from each of the sources to the plurality of timed circuits. In other words, the software or method may analyze the determined plurality of timed circuits and determine from where each timed circuit will receive timing signals for its timed operations. Note that the source of timing signals for each timed circuit may be another timed circuit, a clock signal, an external circuit or device, or any other type of signal source.

Other timing and triggering information that may be determined may include a starting order of the plurality of timed circuits, and a stopping order of the plurality of timed circuits. This type of order determination may be necessary to satisfy dependencies among the timed circuit operations. For example, if one circuit is slaved to another circuit, such that an operation of the slave circuit is triggered by a signal from the master, the slave circuit may need to be started first so that if the master circuit sends the trigger signal upon startup, the slave circuit will already be up and running, e.g., "listening" for the trigger signal when it occurs.

In 608, the software may configure the timed circuits in accordance with the timing and triggering information. In other words, the software may set one or more parameters governing operation of the timed circuits. For example, in one embodiment, the software may write values to various registers on one or more I/O devices to configure the timed circuits.

Finally, in 610, the software may operate the configured plurality of timed circuits to perform the I/O operation. For example, the software may initiate operation of each of the plurality of timed circuits in accordance with the determined starting order mentioned above in 606. Similarly, once the specified task or functionality is performed the software may terminate operation of each of the plurality of timed circuits in accordance with the determined stopping order, also mentioned above in 606.

In various embodiments, the analysis of 606 may involve any of various parameters and behaviors related to the timing and operation of the timed circuits, some examples of which are described below.

As is well known, in many applications a timing signal may be exported to stimulate another activity, e.g., in a user's program, in another operation on another device, and so forth. In some embodiments, the plurality of timed circuits may include two or more instances of a timing signal. Thus, prior to or as part of a configuration process, input may be received requesting export of a timing signal from the plurality of timed circuits. For example, user input may be received via a GUI requesting the timing signal export.

In such cases, analyzing the plurality of timed circuits may include determining a source of a timing signal for export by selecting one of the two or more instances of the timing signal as the exported timing signal, and operating the plurality of timed circuits may include exporting the selected one of the two or more instances of the timing signal. The exported timing signal may then stimulate or otherwise trigger the activity or operation in the user's program, other device, etc. Note that the exported timing signal may be used for any purpose by any system or process as desired.

In many cases, property settings may be applied to all parts of the composite timed operation. For example, these types of properties may affect such aspects of the system as:

a. how data are transferred between an I/O device and computer memory, b. the size of a buffer in computer memory; note that in some embodiments, the software may allocate one computer memory buffer per timed operation within the composite operation, although to the user there may appear to be only one buffer, and c. how data are transferred from the computer memory buffers to the user's program buffer.

Note that the above are only meant to be exemplary properties, and are not intended to limit the properties to any particular set.

However, in some applications, there may be situations where a desired property setting cannot be satisfied by one or more of the devices within a composite timed operation. Thus, in some embodiments, user input may be received specifying property settings for the plurality of timed circuits, and analyzing the plurality of timed circuits may include for each specified property setting, determining if the property setting can be applied directly to each of the plurality of timed circuits, or if the property setting must be modified for application to one or more of the plurality of timed circuits.

Thus, configuring the timed circuits may include, for each specified property setting, if the property setting can be applied directly to each of the plurality of timed circuits, applying the specified property settings to each of the plurality of timed circuits, and if the property setting must be modified for application to one or more of the plurality of timed circuits, modifying the property setting and applying the modified setting to the one or more of the plurality of timed circuits.

In some cases, an application may need to determine an operation status of timed operations. Thus, in some embodiments, executing the graphical program may include querying a value of a property, e.g., the value of an operation status parameter, and may include invoking the software to determine one or more of the plurality of timed circuits to query. The software may query the determined one or more timed circuits for the value of the property, and if two or more timed circuits are queried, may determine whether to return a minimum, maximum, sum, or average of a plurality of values queried, and return the value of the property to the graphical program.

In other words, in order to satisfy the query, the software may determine whether multiple timed circuits are to be queried, and if so, may further determine how to process the multiple property values (retrieved from the multiple timed circuits) in order to return a single value for the query. As a simple example, the query may relate to the number of reads performed since startup, where three timed circuits are involved in read operations. The software may thus determine the three timed circuits, query each of them for number of reads performed, and may return the sum of the values, i.e., the total number of reads for (from) the three timed circuits.

As noted above, in various embodiments, the I/O operation may include a read or write operation from one or more of the plurality of timed circuits. For example, where the I/O operation includes a read operation from one or more of the plurality of timed circuits, executing the graphical program to perform the I/O operation may include the graphical program issuing a read request for a specified input type. In one embodiment, in response to the read request, the software may determine one or more of the plurality of timed circuits to read to satisfy the read request. The software may then read data from the determined one or more timed circuits, may format the data into an order expected by the graphical program, and may return the data to the graphical program. Note that this formatting may be necessary because depending on the particular arrangement of the graphical program, e.g., the ordering of channel creation nodes, the graphical program may expect to receive read data in a particular order. Said another way, in reading data from all timed operations to satisfy a single read request made by an application, the data may be required to be returned such that the order of the data in the (return) array is identical to the order the channels were specified when the composite timed operation was created, e.g., when the graphical program was created.

Similarly, where the I/O operation includes a write operation to one or more of the plurality of timed circuits, executing the graphical program to perform the I/O operation may include the graphical program issuing a write request for a specified output type. In response to the write request, the software may determine one or more of the plurality of timed circuits to write to to satisfy the write request. The software may then receive data from the graphical program, may format the data into an order required by the timed circuits, and may write the data to the determined one or more timed circuits. Thus, similar to the above, in writing data to all parts of the composite timed operation to satisfy a single call to a write function made by an application, the data may be required to be written to the channels in the composite operation in the same order those channels were specified when the composite operation was created, e.g., when the graphical program was created.

Note that in preferred embodiments, all channels within a task share the same timing and triggering. The fact that all channels are in the same task allows the synchronization method described above to be automatic. In one embodiment, additional channels of the same type may be added to the program, e.g., by simply adding the channel(s) to the input list of the create channel node, e.g., at the beginning of the task. Of course, multiple tasks may be included in the graphical program, and so the graphical program may support multiple I/O types, some examples of which are described below.

Figure 1B:
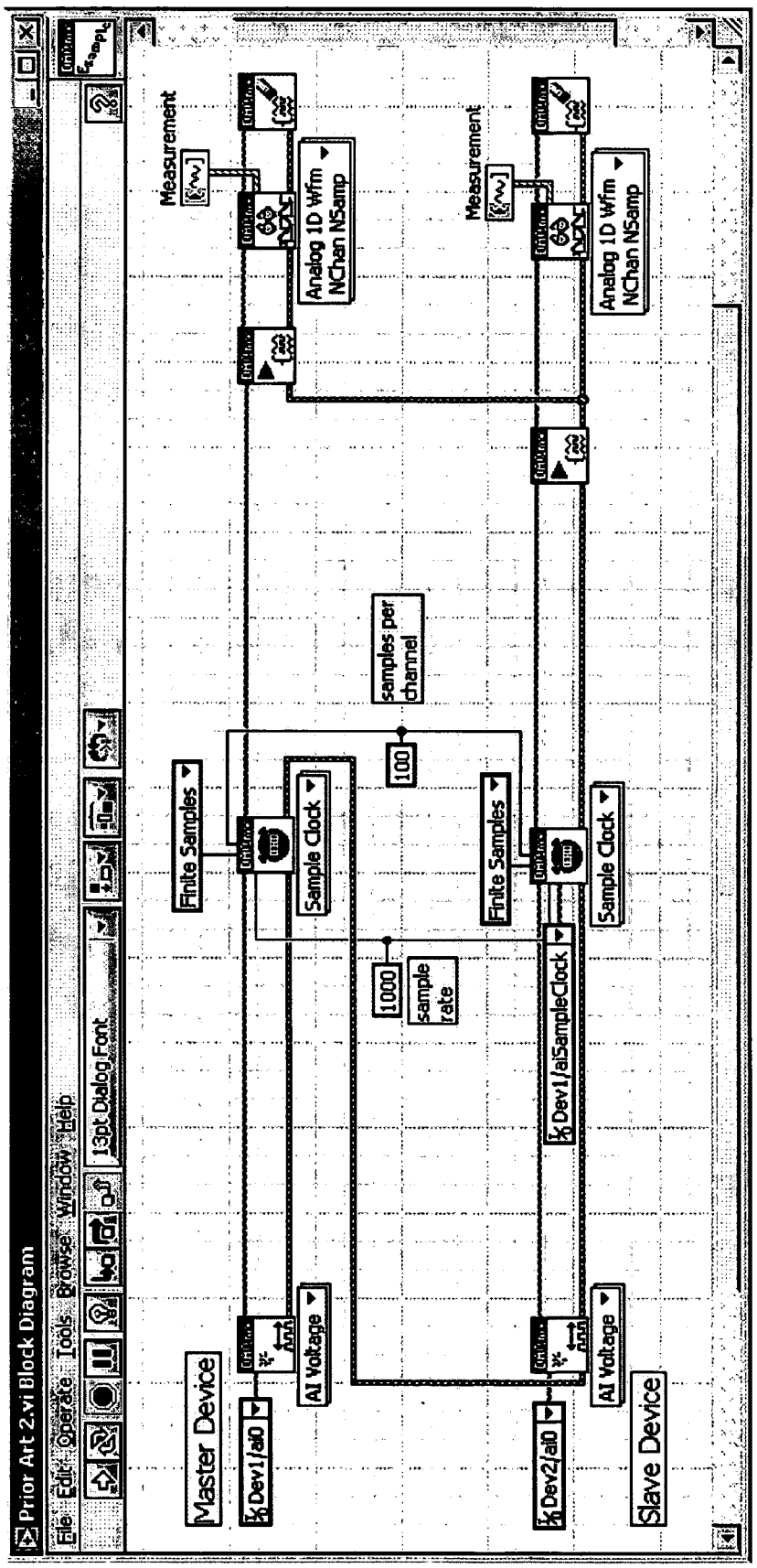
Figure 7:
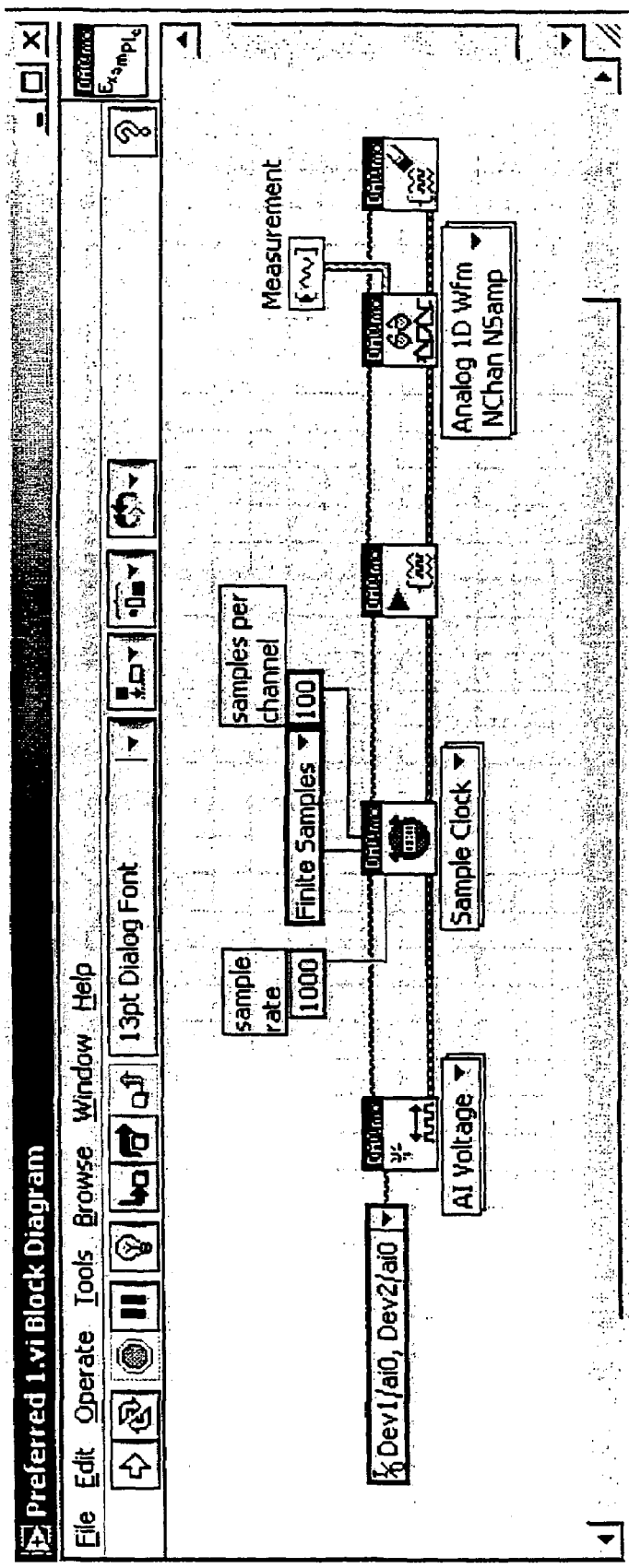
FIG. 7 illustrates one embodiment of a block diagram for automatically synchronizing the multiple devices of FIGS. 1A and 1B.

FIG. 7 illustrates one embodiment of an example program that accomplishes substantially the same task as the programs in FIGS. 1A and 1B, but uses an embodiment of the automatic multiple operation synchronization techniques described above. As may be seen, the graphical program organizes (creates and includes) a plurality of channels into a task. More specifically, a create channel node, labeled "AI Voltage" receives a list specifying a plurality of channels, all of type AI (analog input), here shown including an analog input on device 1 (Dev1/ai0), and an analog input on device 2 (Dev2/ai0). The channel creation node is placed on or couples to a task, represented by the top horizontal thin wire or line traversing the diagram from left to right. As FIG. 7 shows, the task also includes a clock, labeled "Sample Clock", a start node, indicated by an icon with a "Play" triangle image, a read node, indicated by an image of reading glasses, and a cleanup node, represented by an image of a pencil eraser.

Upon execution, the graphical program instructs software according to embodiments of the present invention (e.g., driver software) to impose a certain timing configuration on the task such that the timed circuits comprising the plurality of channels in the task are all subject to the same timing configuration, and are thus synchronized. Note that in graphical programs that include multiple tasks, the I/O channels included in each task will preferably share the same timing and triggering. An example of such a graphical program is described below with reference to FIG. 12B.

As FIG. 7 shows, rather than having multiple parallel node sequences for synchronizing multiple devices, the program has a single row of nodes that operate on a list of channels of the same type, here shown as input to the AI Voltage node, including Dev1/ai0 and Dev2/ai0. As described above, the single row of nodes corresponds to or specifies functionality of the task.

Execution of the graphical program invokes execution of the software, e.g., driver software, which may then determine which device (of the plurality of I/O devices) is the master, determine which signals to route between the devices, and control the start order. If the customer desires to add a third device to this task, the customer simply adds that device to the list that is connected to the node labeled 'AI Voltage', which may be referred to as a channel node.

Note the substantial simplification of the program of FIG. 7 as compared to those of FIGS. 1A and 1B.

Creating the Graphical Program

The following describes one approach for creating a graphical program operable to receive and respond to user interface events. It is noted that some of the method elements may occur concurrently or in different orders than described.

A graphical user interface or front panel for the graphical program may be created, e.g., in response to user input. The graphical user interface may be created in any of various ways, e.g., depending on the graphical programming development environment used.

A block diagram for the graphical program may be created. The block diagram may be created in or using any graphical programming development environment, such as LabVIEW, Simulink, VEE, or another graphical programming development environment. The block diagram may be created in response to direct user input, e.g., the user may create the block diagram by placing or "dragging and dropping" icons or nodes on the display and interconnecting the nodes in a desired fashion. Alternatively, the block diagram may be programmatically created from a program specification. The plurality of nodes in the block diagram may be interconnected to visually indicate functionality of the graphical program. The block diagram may have one or more of data flow, control flow, and/or execution flow representations.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal nodes or nodes in the block diagram. As another example, the graphical user interface elements may be comprised in the diagram.

The graphical program may then be executed to perform a desired task, e.g., the above synchronization method. As described above, the graphical program may be executed on any kind of computer system(s) or reconfigurable hardware.

FIGS. 8A-11B—Further Example Graphical Programs

FIGS. 8A-8B, 9A-9B, 10A-10B, and 11A-11B illustrate additional example graphical programs using prior art approaches (the "A" figures), and using embodiments of the present invention (corresponding "B" figures). Each respective pair of programs illustrates how the present techniques greatly simplify the programming needed to synchronize operations.

Figure 8A:
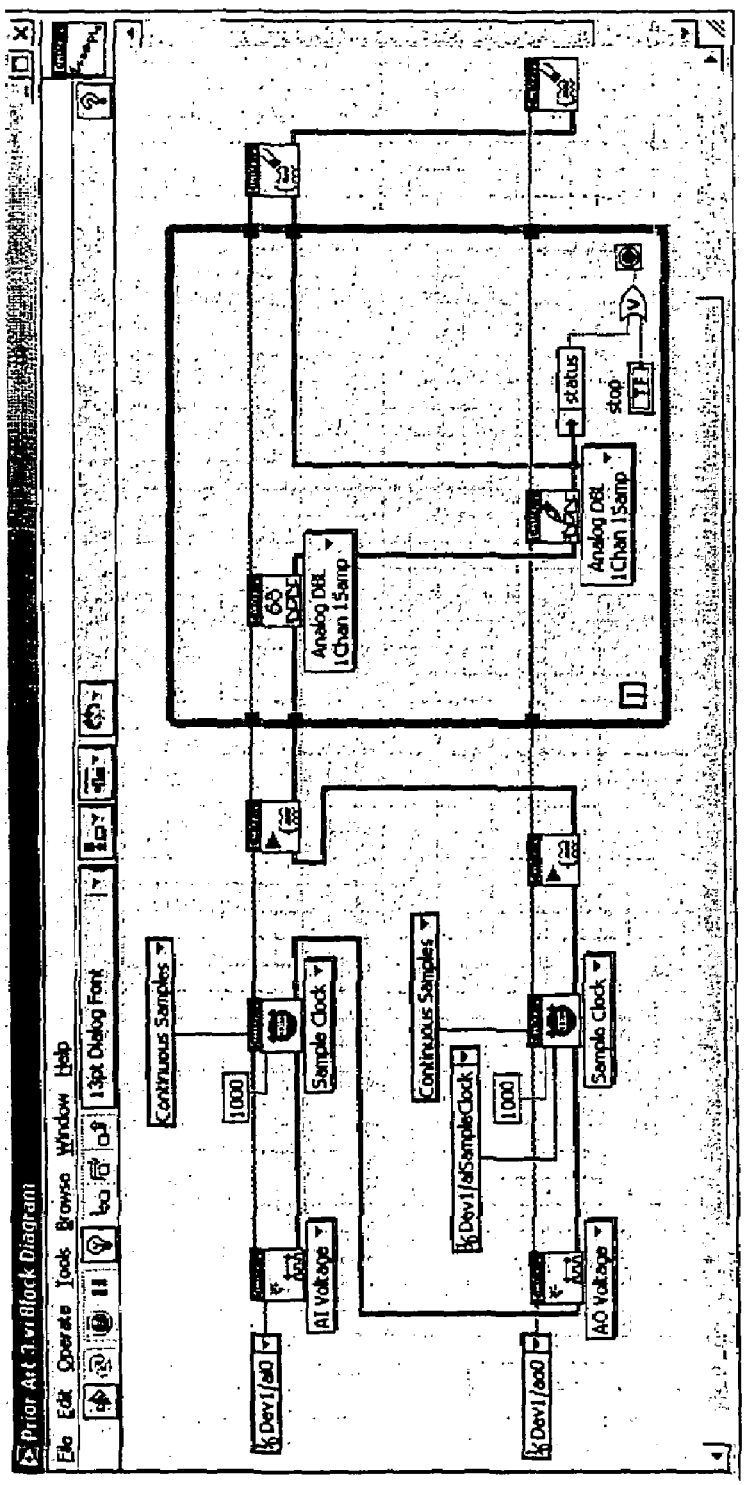
FIGS. 8A-12B illustrate exemplary block diagrams comparing prior art synchronization techniques ("A" figures) with embodiments of the automatic synchronization techniques of the present invention ("B" figures).

One type of task synchronization involves two or more operations that occur on the same device. It is common in control applications to read input data and write output data whose value is calculated based on the input data in order to control some external process such as temperature or position. It is often desired that input and output data be timed identically. FIG. 8A illustrates a program for synchronizing such operations according to the prior art. Although both input and output channels are on the same device the two operations are programmed separately and the output operation must be programmed to share the input operation's sample clock.

As FIG. 8A shows, the sharing of the sample clock is accomplished by the "Dev1/aiSampleClock" input to the bottom-most timing node. The timing node selects the source of the sample clock for the AO voltage operation, and as that source it selects the same clock as the AI voltage operation. Note that a while loop is also included in the program, indicated by the large thick wire loop in the right-hand portion of the block diagram and encompassing the read and write nodes. The while loop illustrates the typical sequence of first reading AI data, making a computation (this step is missing) and then writing AO data. This is typically how control applications are done. In these applications it is beneficial to have the AI and AO data sampled and generated from the same clock.

Figure 8B:
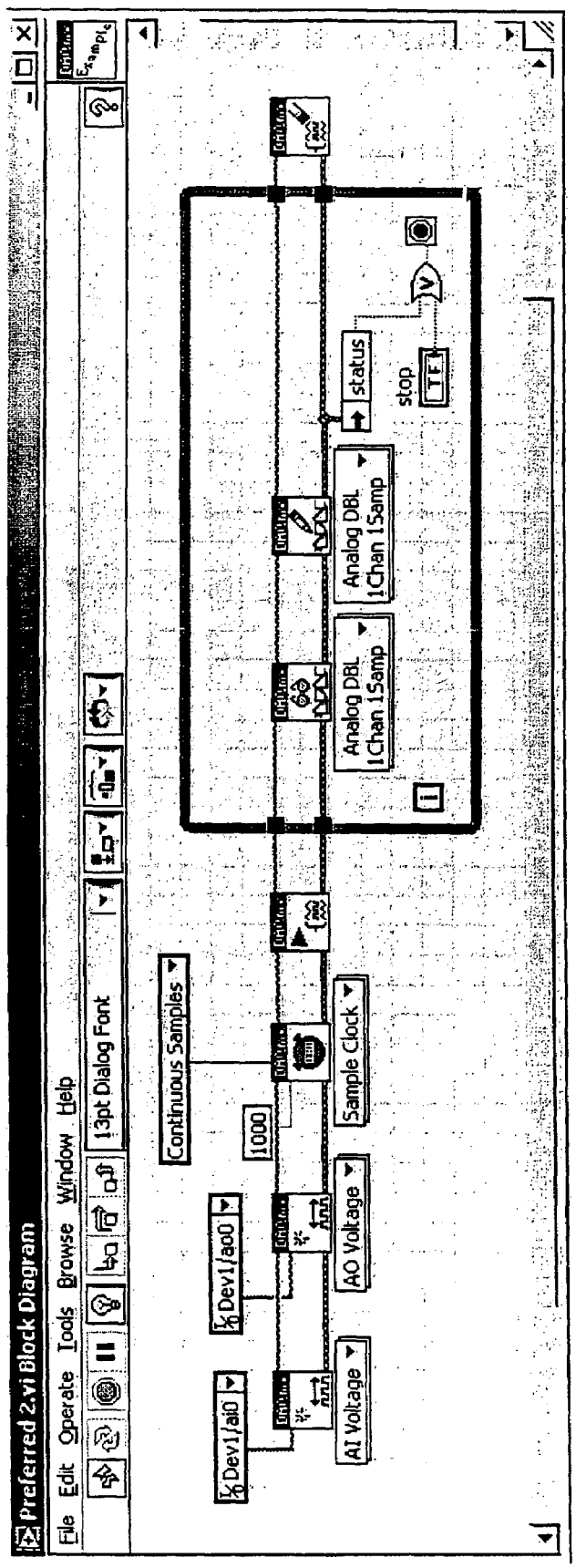

FIG. 8B illustrates a program equivalent to that shown in FIG. 8A except that the program in FIG. 8B uses an embodiment of the automatic task synchronization technique described above. In this example, both input and output channels are part of the same task. The driver software again handles the routing of the sample clock between the two sections of the device and chooses the correct start order.

Note that the routing is transparent, and that the transparency of control signal routing is an important feature of the present invention. The decision to route the AI clock to the AO operation or vice versa may be dictated by the particular device (i.e., only one of the two options may be supported) or it may be arbitrary. Once the choice is made, whichever operation is sourcing the sample clock becomes the master operation and may be started last.

In many cases all timing and triggering signals are generated by circuits internal to the measurement devices performing the operations and the choice of the master device is arbitrary. It is also common that one or more of the timing and triggering signals derives from an external signal connected to a particular device among the devices performing the measurement operation. In these cases the choice of the master device is determined by which device is receiving the signal from an external source. In cases where two or more signals are sourced externally the type of signal must also be taken into consideration when choosing the master device to start last in the start order.

Figure 9A:
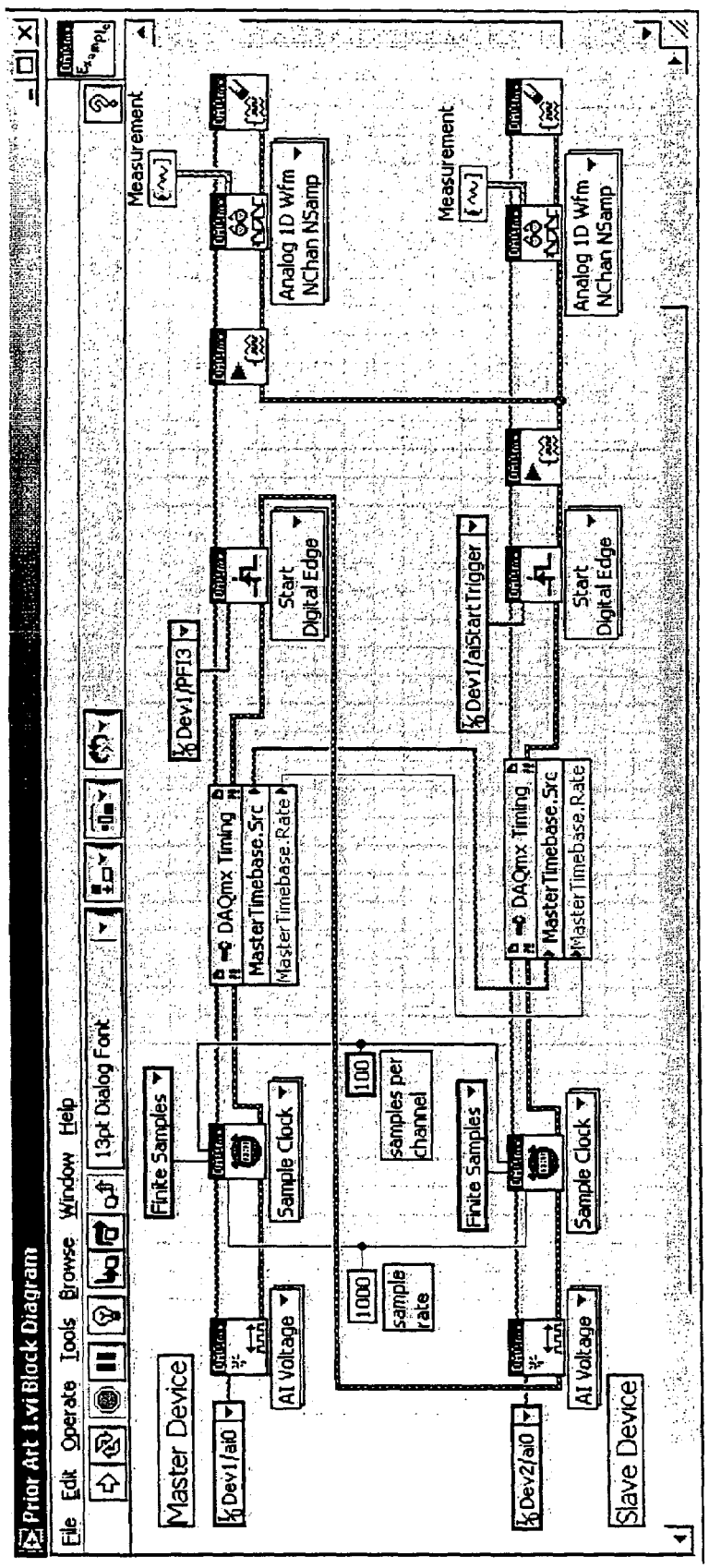

FIG. 9A, a modified version of FIG. 1A, illustrates the programming necessary in a graphical language such as LabVIEW to configure two devices to begin their sampling at the time that the device called Dev1 receives a signal at its external PFI 3 terminal pin, using prior art techniques. Similar to the earlier prior art examples, it may be seen that significant programming effort and complexity is required.

Figure 9B:
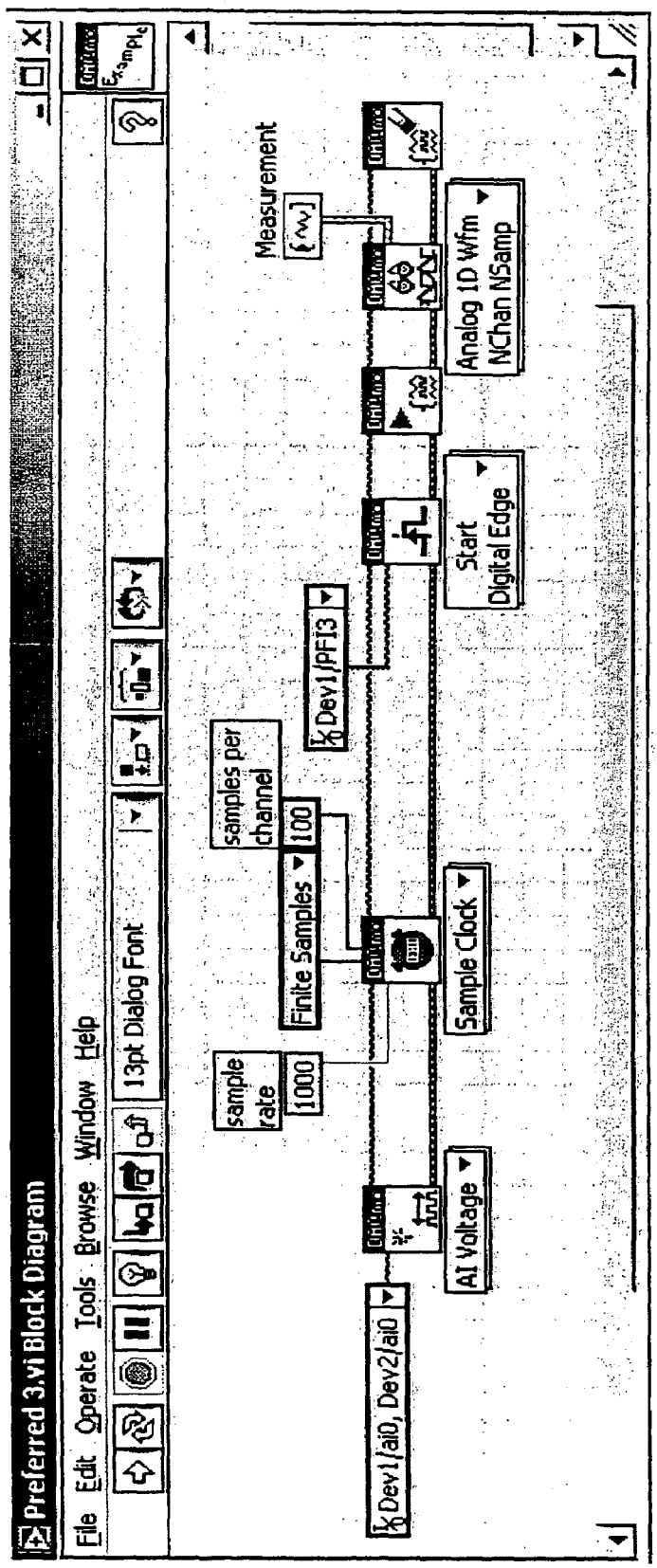

FIG. 9B illustrates a corresponding program that uses an embodiment of the automatic task synchronization technique described herein. To program the devices successfully, the driver software chooses Dev1 as the Master, routes its signals to the device called Dev2 and starts Dev1 last. Again, note the substantial simplification of the programming required as compared to the corresponding prior art program of FIG. 9A.

Figure 10A:
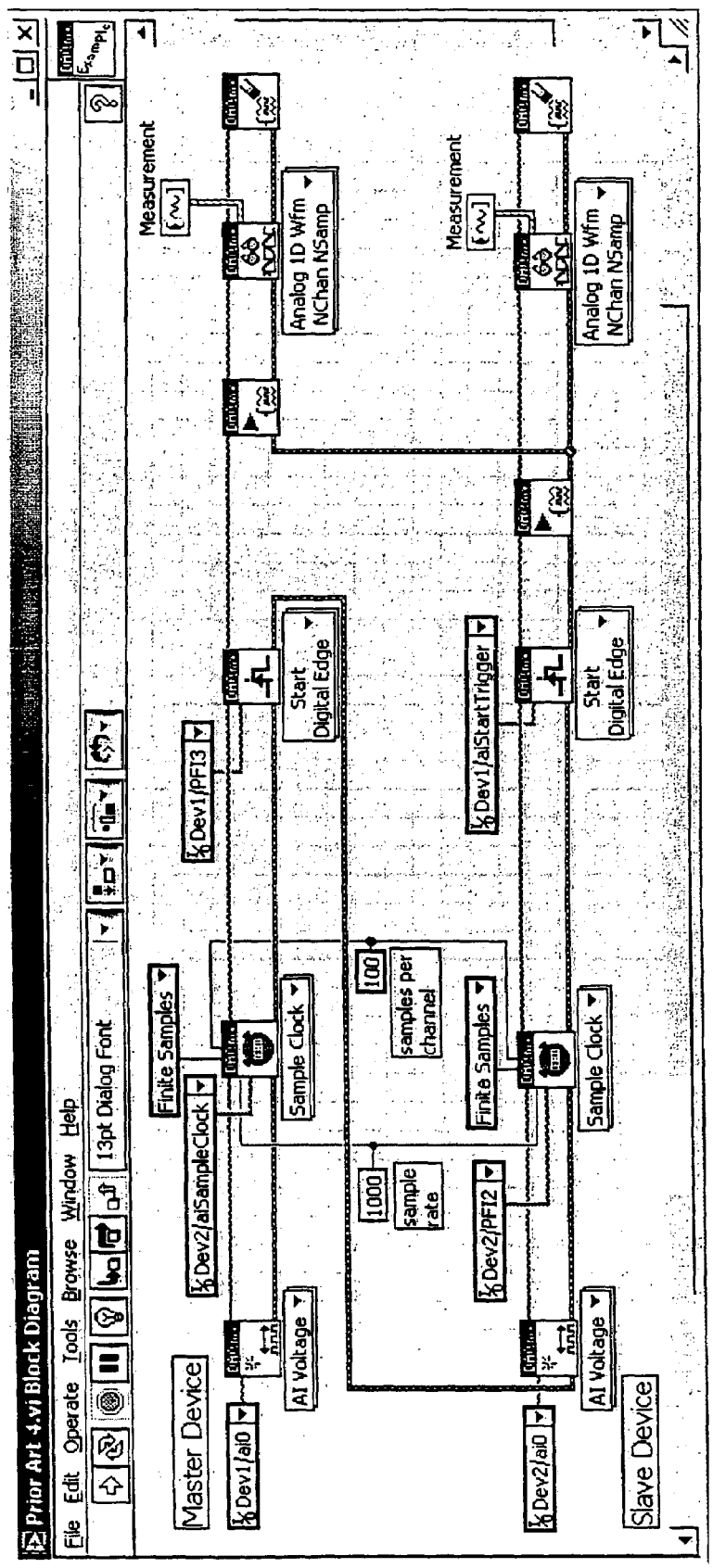

In some cases it may be necessary to connect external timing signals to different devices. FIG. 10A illustrates one such application, according to the prior art. In this example, the sample clock is provided from an external source and connected to the PFI 2 terminal pin of the device named Dev2.

Note that the lower Sample Clock node configures the Sample Clock for the device named 'Dev2' to be the signal connected to the PFI2 terminal of 'Dev2'. This is a terminal on the I/O connector and is an external source. The upper Sample Clock node configures the Sample Clock for the device named 'Dev1' to be whatever 'Dev2' is using as its Sample Clock. The terminal 'Dev2/aiSampleClock' names a location within 'Dev2' where its Sample Clock can be found, regardless of its source. Some terminals are 'internal' and some are 'external', a distinction not indicated by their names.

In this example, the trigger that will start the operation is connected to the PFI 3 terminal pin of the device named Dev1. This program correctly treats Dev1 as the master device, starting it last.

Figure 10B:
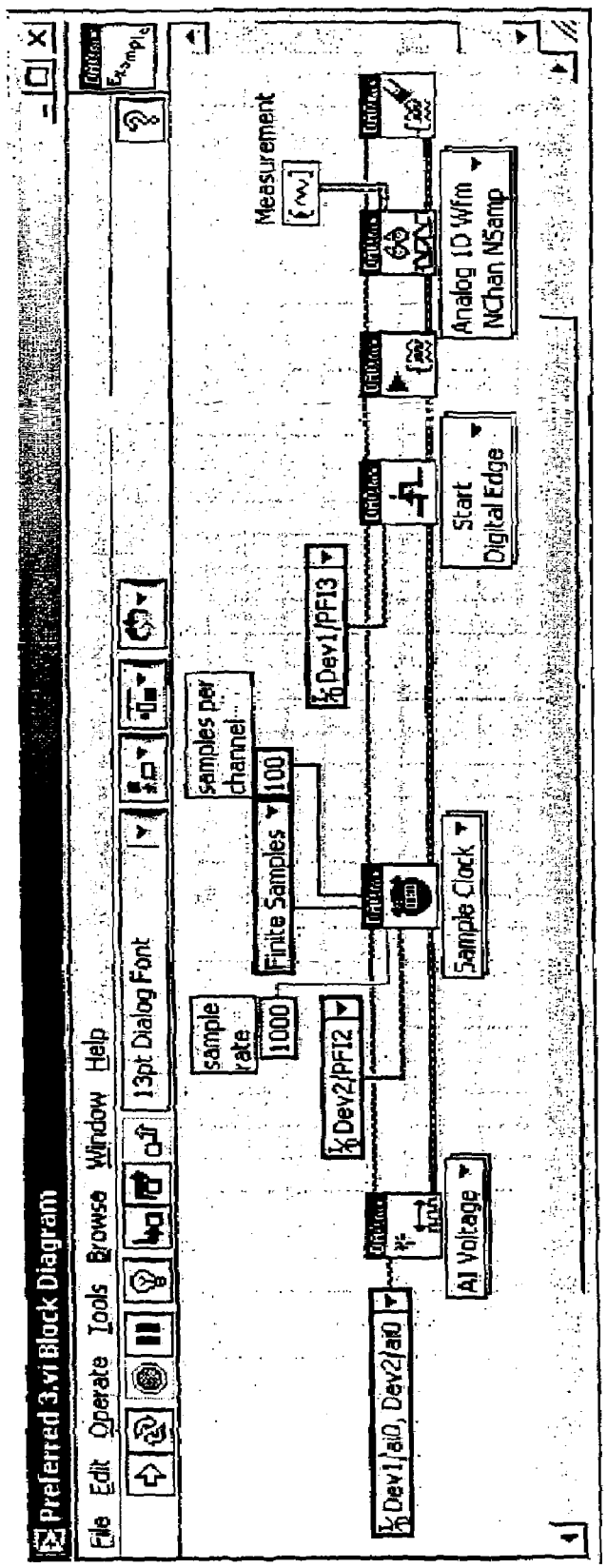

The program illustrated by FIG. 10B illustrates a program for performing the synchronization task of FIG. 10A, but using an embodiment of the automatic task synchronization technique described herein. Note that even though the sample clock must be routed from the device named Dev2 to the device named Dev1, the latter is chosen as the master device because the trigger that starts the operation originates from Dev1. Note also that the Sample Clock node indicates that the signal at the PFI 2 pin of Dev2 must be used as the Sample Clock. Thus Dev2 may send this signal over to Dev1.

Note that removing the node that creates the start trigger from the program in FIG. 10B causes the driver software to choose the device named Dev2 as the master. The sample clock may be shared and routed from Dev2 to Dev1. The program works with no further modifications because the driver software, not the program itself, adjusts to the change. If this same alteration were made to the program written in the prior art illustrated in FIG. 10A, the structure of the program itself would have to change in order to start the device named Dev2 last, instead of first.

Figure 11A:
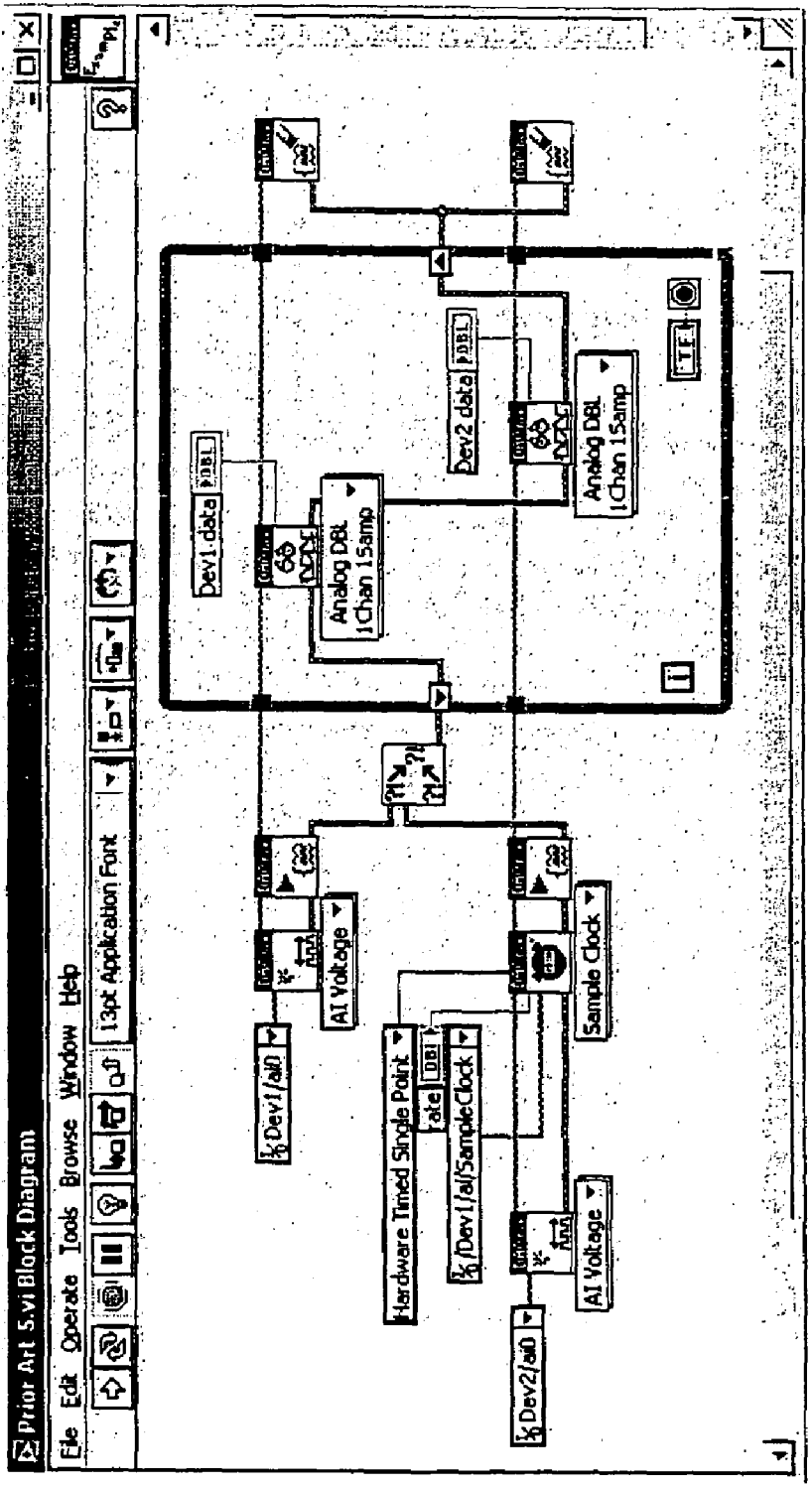

FIG. 11A illustrates a program where two devices are programmed to acquire analog input data using a timing mode called 'on demand', according to the prior art. Instead of using a periodic signal (a Sample Clock) as the stimulus for acquiring the data, the read nodes inside the while loop supply this stimulus. During the execution of the read node the software issues a command to the device to acquire the data. This mode is also referred to as 'software timed'. There is no hardware clock that determines when the devices acquire the data. Instead the rate of acquisition is determined by the speed of the loop.

Note that the program of FIG. 11A is constructed such that both devices acquire their data at the same time. To accomplish this, the second device (Dev2, programmed by the nodes in the bottom row) is configured to use Sample Clock timing. The source of Dev2's Sample Clock is configured to be the Sample Clock of Dev1. Even though Dev1 is software timed, it produces a digital pulse every time it is commanded by the read node to acquire data. This digital pulse is routed to Dev2 to use as its Sample Clock. In addition, Dev2 must be configured for a Hardware Timed Single Point mode of operation. This is to override the default waveform capture mode of operation that is assumed to be desired whenever a device is configured to use Sample Clock hardware timing. Inside the while loop the read node for Dev1 must be called first. The command it issues to Dev1 to acquire data is also received by Dev2 which also responds by acquiring data. After the read node for Dev1 finishes the read node for Dev2 executes and merely returns the data previously acquired by Dev2.

Figure 11B:
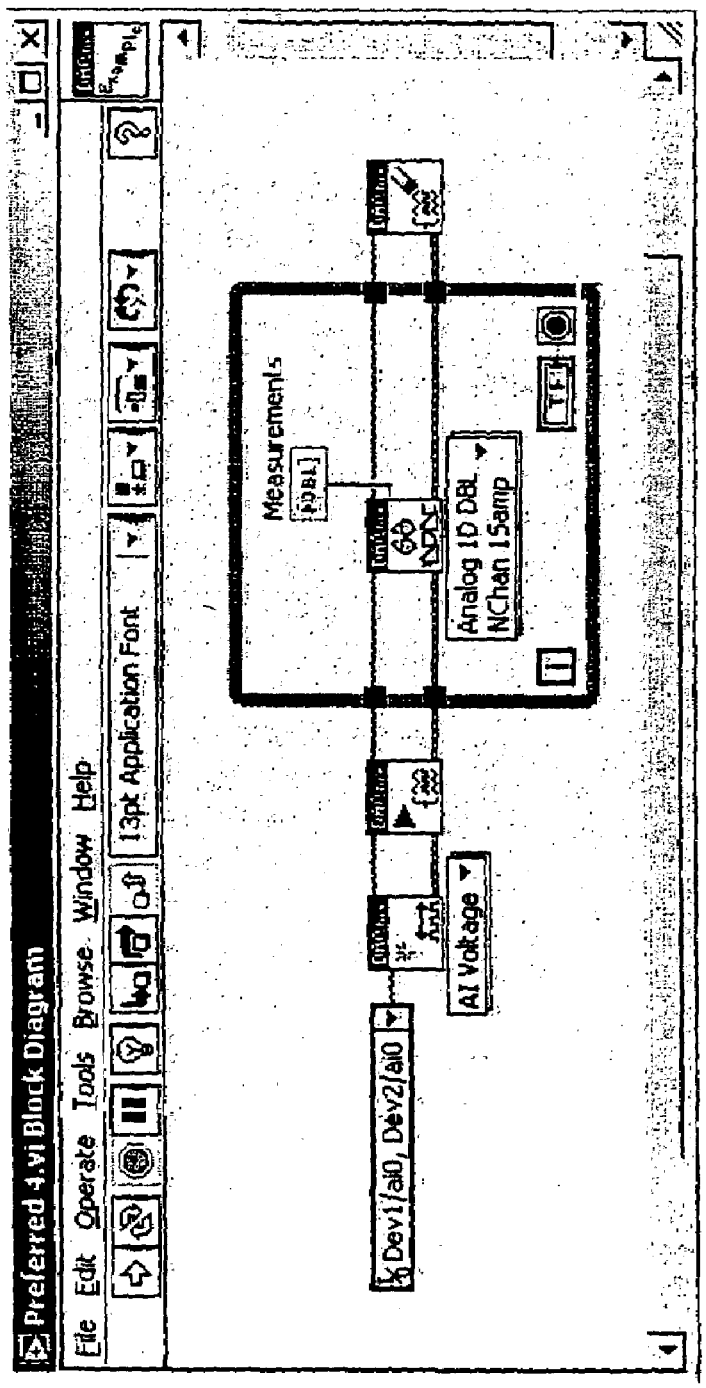

FIG. 11B illustrates a program equivalent in functionality to the program in FIG. 11A, but using an embodiment of the present invention. Analog input channels from both devices are included in the same task. The driver performs the configuration steps required, knows which device to read from first, and combines the data from both for returning to the application.

Figure 12A:
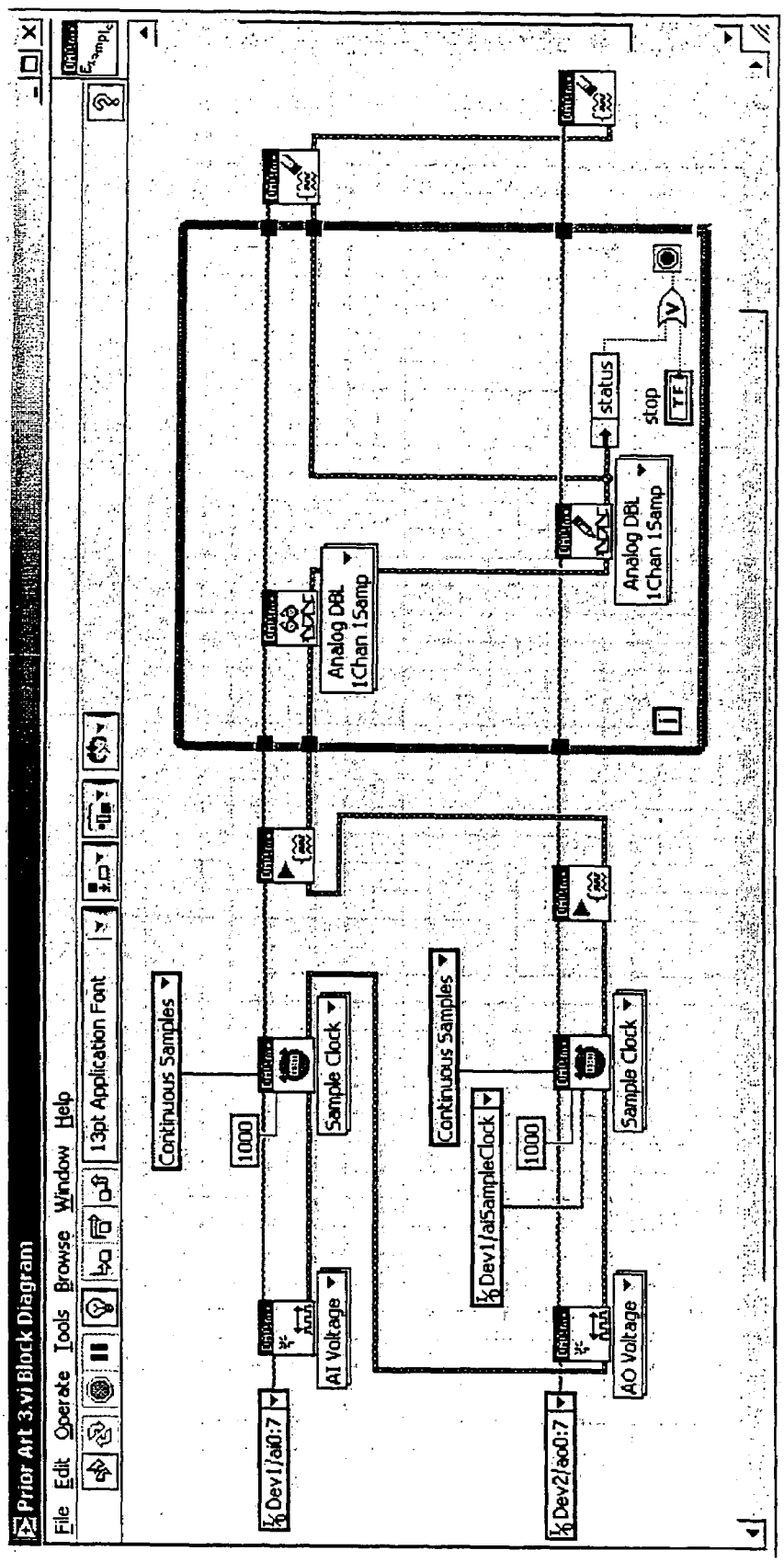

It is sometimes required that an equal number of input and output channels be used and it is often necessary to use two or more devices to accomplish this. FIG. 12A illustrates such a program, according to the prior art. As FIG. 12A shows, eight analog input channels are read from Device 1 and eight analog output channels are written to Device 2. The program configures both devices separately, sharing a common sample clock between them, and controlling the starting order.

Figure 12B:
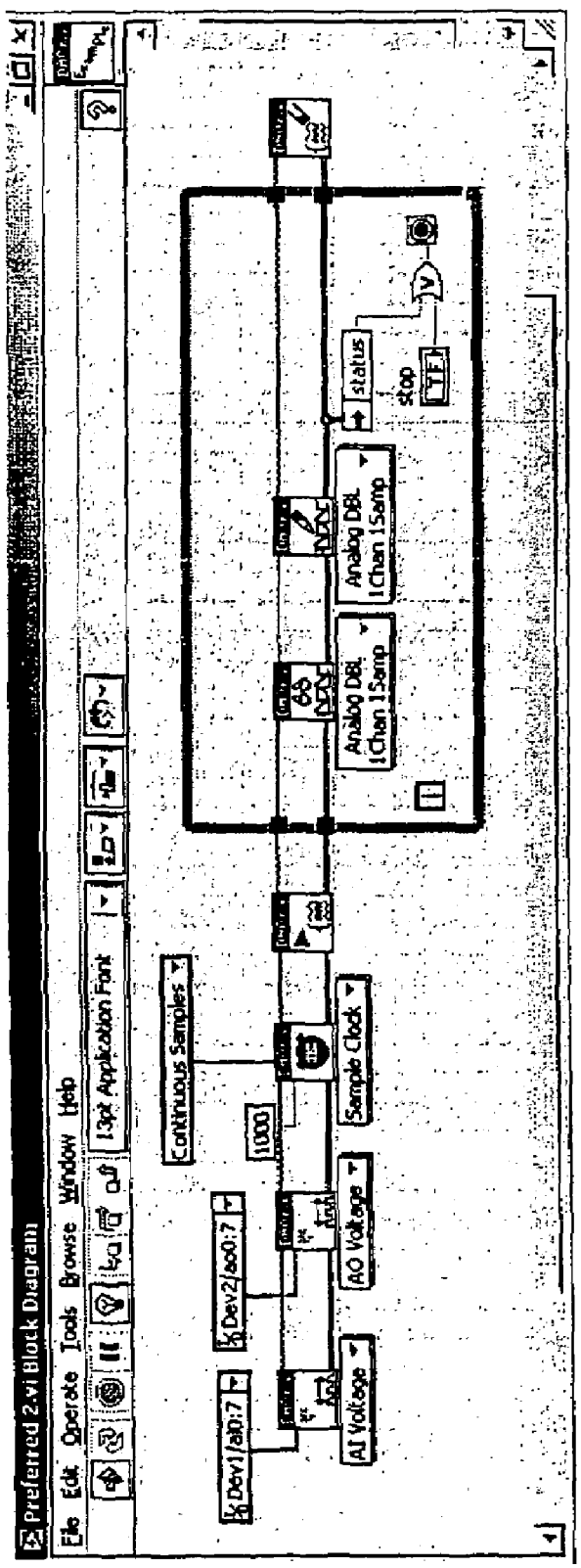

FIG. 12B illustrates a program with similar functionality as the program of FIG. 12A, but implemented according to one embodiment of the automatic task synchronization technique disclosed herein. As shown, the eight input channels on one device and the eight output channels on the other device are all part of the same task. The driver software again handles the routing of the sample clock between the two sections of the device and chooses the correct start order. Again, note the simplicity of this program as compared to the program of FIG. 12A.

Thus, various embodiments of the systems and methods described herein may facilitate automatic synchronization of devices with homogeneous and/or heterogeneous timing and I/O channel types, and may simplify development, modification, and maintenance of graphical programs directed to that end.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for automatic synchronization of I/O devices, comprising:
   creating a graphical program in response to user input, wherein the graphical program specifies timing configuration and operation of a plurality of timed circuits comprised on one or more I/O devices; and
   executing the graphical program to perform an I/O operation using the one or more I/O devices, wherein said executing comprises invoking software to perform:
      analyzing the plurality of timed circuits to determine timing and triggering information for synchronous operation of the plurality of timed circuits, wherein said analyzing comprises:
         determining the number and types of timing signals for each of the plurality of timed circuits;
         determining sharing of the timing signals in order to synchronize the timed circuits;
         determining sources of timing signals for each of the plurality of timed circuits;
         determining timing signal routes from each of the sources to the plurality of timed circuits; and
         determining a starting order of the plurality of timed circuits;
      configuring the timed circuits in accordance with the timing and triggering information; and
      operating the configured plurality of timed circuits to perform the I/O operation in a synchronous manner, wherein said operating the plurality of timed circuits comprises:
         initiating operation of each of the plurality of timed circuits in accordance with the determined starting order.

2. The computer-implemented method of claim 1, wherein said analyzing the plurality of timed circuits comprises:
   determining the plurality of timed circuits, wherein each of the plurality of timed circuits comprises one of:
      an input circuit comprising one or more input channels, wherein the input circuit is operable to read data from the one or more input channels and provide the data to the graphical program; and
      an output circuit comprising one or more output channels, wherein the output circuit is operable to receive data from the graphical program and write the data to the one or more output channels.

3. The computer-implemented method of claim 1,
   wherein said analyzing the plurality of timed circuits comprises:
      determining a stopping order of the plurality of timed circuits; and
   wherein said operating the plurality of timed circuits comprises:
      terminating operation of each of the plurality of timed circuits in accordance with the determined stopping order.

4. The computer-implemented method of claim 1,
   wherein the plurality of timed circuits comprises two or more instances of a timing signal, and wherein the method further comprises:
      receiving input requesting export of a timing signal from the plurality of timed circuits;
   wherein said analyzing the plurality of timed circuits comprises:
      determining a source of a timing signal for export by selecting one of the two or more instances of the timing signal as the exported timing signal; and
   wherein said operating the plurality of timed circuits comprises:
      exporting the selected one of the two or more instances of the timing signal.

5. The computer-implemented method of claim 1, further comprising:
   receiving user input specifying property settings for the plurality of timed circuits;
   wherein said analyzing the plurality of timed circuits comprises:
      for each specified property setting, determining if the property setting can be applied directly to each of the plurality of timed circuits, or if the property setting must be modified for application to one or more of the plurality of timed circuits; and
   wherein said configuring the timed circuits comprises:
      for each specified property setting,
         if the property setting can be applied directly to each of the plurality of timed circuits, applying the specified property settings to each of the plurality of timed circuits; and
         if the property setting must be modified for application to one or more of the plurality of timed circuits, modifying the property setting and applying the modified setting to the one or more of the plurality of timed circuits.

6. The computer-implemented method of claim 1, wherein said executing the graphical program comprises querying a value of a property, comprising invoking the software to perform:
   determining one or more of the plurality of timed circuits to query;
   querying the determined one or more timed circuits for the value of the property;
   if two or more timed circuits are queried, determining, whether to return a minimum, maximum, sum, or average of a plurality of values queried; and
   returning the value of the property to the graphical program.

7. The computer-implemented method of claim 1, wherein the plurality of timed circuits are comprised on a plurality of I/O devices.

8. The computer-implemented method of claim 1, wherein the plurality of timed circuits are comprised on a single I/O device.

9. The computer-implemented method of claim 1, wherein the plurality of timed circuits comprise a plurality of channels.

10. The computer-implemented method of claim 1, wherein the plurality of channels are all of the same I/O type.

11. The computer-implemented method of claim 1, wherein the plurality of channels comprise multiple I/O types.

12. The computer-implemented method of claim 1, wherein timing and triggering for the plurality of timed circuits is homogeneous.

13. The computer-implemented method of claim 1, wherein timing and triggering for the plurality of timed circuits is heterogeneous.

14. The computer-implemented method of claim 1, wherein the I/O operation comprises a read operation from one or more of the plurality of timed circuits, and wherein said executing the graphical program to perform the I/O operation comprises the graphical program issuing a read request for a specified input type.

15. The computer-implemented method of claim 14, the method further comprising:
   in response to the read request, the software performing:
      determining one or more of the plurality of timed circuits to read to satisfy the read request;
      reading data from the determined one or more timed circuits;
      formatting the data into an order expected by the graphical program; and
      returning the data to the graphical program.

16. The computer-implemented method of claim 1, wherein the I/O operation comprises a write operation to one or more of the plurality of timed circuits, and wherein said executing the graphical program to perform the I/O operation comprises the graphical program issuing a write request for a specified output type.

17. The computer-implemented method of claim 16, the method further comprising:
   in response to the write request, the software performing:
      determining one or more of the plurality of timed circuits to write to in order to satisfy the write request;
      receiving data from the graphical program;
      formatting the data into an order required by the timed circuits; and
      writing the data to the determined one or more timed circuits.

18. The computer-implemented method of claim 1, wherein the graphical program comprises a plurality of interconnected nodes that visually indicate functionality of the graphical program.

19. The computer-implemented method of claim 1, wherein said creating the graphical program comprises:
   arranging a plurality of nodes on a display; and
   interconnecting the plurality of nodes in response to user input.

20. The computer-implemented method of claim 1, wherein the graphical program comprises a block diagram portion and a user interface portion.

21. The computer-implemented method of claim 20, wherein, during execution of the graphical program, the graphical user interface is displayed on a display of a first computer system and the block diagram executes on a second computer system.

22. The computer-implemented method of claim 1, wherein the graphical program comprises a graphical data flow program.

23. The computer-implemented method of claim 1, wherein the graphical program is operable to perform one or more of:
   an industrial automation function;
   a process control function;
   a test and measurement function; and
   a simulation function.

24. The computer-implemented method of claim 1, wherein the software comprises driver software.

25. A memory medium which stores program instructions for automatic synchronization of I/O devices, wherein the program instructions are executable by a processor to implement:
   a graphical program, wherein the graphical program specifies configuration and operation of a plurality of timed circuits comprised on one or more I/O devices;
   wherein the program instructions are further executable to implement:
      executing the graphical program to perform an I/O operation using the one or more I/O devices, wherein said executing comprises invoking software to perform:
         analyzing the plurality of timed circuits to determine timing and triggering information for synchronous operation of the plurality of timed circuits, wherein said analyzing comprises:
            determining the number and types of timing signals for each of the plurality of timed circuits;
            determining sharing of the timing signals in order to synchronize the timed circuits;
            determining sources of timing signals for each of the plurality of timed circuits;
            determining timing signal routes from each of the sources to the plurality of timed circuits; and
            determining a starting order of the plurality of timed circuits;
         configuring the timed circuits in accordance with the timing and triggering information; and
         operating the configured plurality of timed circuits to perform the I/O operation in a synchronous manner, wherein said operating the plurality of timed circuits comprises:
            initiating operation of each of the plurality of timed circuits in accordance with the determined starting order.

26. A system for automatic synchronization of I/O devices, comprising:
   a computer system, comprising:
      a processor; and
      a memory medium coupled to the processor;
   one or more I/O devices coupled to the processor and memory medium;
   wherein the memory medium stores a graphical program, wherein the graphical program specifies configuration and operation of a plurality of timed circuits comprised on the one or more I/O devices, and wherein the graphical program is executable to perform an I/O operation using the one or more I/O devices;
   wherein, in being executable, the graphical program is executable to invoke software to perform:
      analyzing the plurality of timed circuits to determine timing and triggering information for synchronous operation of the plurality of timed circuits, wherein said analyzing comprises:
         determining the number and types of timing signals for each of the plurality of timed circuits;
         determining sharing of the timing signals in order to synchronize the timed circuits;
         determining sources of timing signals for each of the plurality of timed circuits;
         determining timing signal routes from each of the sources to the plurality of timed circuits; and
         determining a starting order of the plurality of timed circuits;
      configuring the timed circuits in accordance with the timing and triggering information; and
      operating the configured plurality of timed circuits to perform the I/O operation in a synchronous manner, wherein said operating the plurality of timed circuits comprises:
         initiating operation of each of the plurality of timed circuits in accordance with the determined starting order.

27. A method for automatic synchronization of I/O devices, comprising:

creating a graphical program, wherein the graphical program specifies configuration and operation of a plurality of timed circuits comprised on one or more I/O devices;
executing the graphical program to perform an I/O operation using the one or more I/O devices, wherein said executing comprises invoking software to perform:
  determining the plurality of timed circuits, wherein each of the plurality of timed circuits comprises one of:
    an input circuit comprising one or more input channels, wherein the input circuit is operable to read data from the one or more input channels and provide the data to the graphical program; and
    an output circuit comprising one or more output channels, wherein the output circuit is operable to receive data from the graphical program and write the data to the one or more output channels;
  determining the number and types of timing signals for each of the plurality of timed circuits;
  determining sharing of the multiplicity of timing signals in order to synchronize the timed circuits;
  determining sources of timing signals for each of the plurality of timed circuits;
  determining timing signal routes from each of the sources to the plurality of timed circuits;
  determining a starting order of the plurality of timed circuits;
  initiating operation of each of the plurality of timed circuits in accordance with the determined starting order;
  determining a stopping order of the plurality of timed circuits; and
  terminating operation of each of the plurality of timed circuits in accordance with the determined stopping order.

* * * * *